US006016174A

United States Patent [19]
Endo et al.

[11] Patent Number: 6,016,174
[45] Date of Patent: Jan. 18, 2000

[54] METHOD FOR MANUFACTURING ELECTRO-OPTIC ELEMENT

[75] Inventors: Yukio Endo; Nobuhiro Nakamura; Ikuo Ogo, all of Nishigoshi-machi, Japan

[73] Assignee: Advanced Display Inc., Kumamoto, Japan

[21] Appl. No.: 09/048,093

[22] Filed: Mar. 26, 1998

[30] Foreign Application Priority Data

Mar. 27, 1997 [JP] Japan .................................. 9-076297

[51] Int. Cl.[7] ...................................................... G02F 1/136
[52] U.S. Cl. .................................. 349/43; 257/59; 257/72
[58] Field of Search .............................. 349/43; 257/72, 257/59

[56] References Cited

U.S. PATENT DOCUMENTS

| 5,631,473 | 5/1997 | Possin et al. | 257/59 |
| 5,731,856 | 3/1998 | Kim et al. | 349/43 |
| 5,894,136 | 4/1999 | Wook | 257/59 |

FOREIGN PATENT DOCUMENTS

| 59-6578 | 1/1984 | Japan . |
| 61-134786 | 6/1986 | Japan . |
| 8-50308 | 2/1996 | Japan . |

*Primary Examiner*—James A. Dudek
*Attorney, Agent, or Firm*—Oblon, Spivak, McClelland, Maier & Neustadt, P.C.

[57] ABSTRACT

A method for manufacturing electo-optic elements includes steps of: (a-1) forming gate electrodes of the gate line and the TFT by patterning the first metal thin film by the first photolithography process after forming the first metal thin film on the first insulating substrate, (a-2) patterning by dry etching the semiconductor active film and the ohmic contact film by the second photolithography process in the larger and continuous form than the portion in which the source line and the TFT are formed after forming the first insulating film, semiconductor active film, and ohmic contact film, (a-3) patterning the second metal thin film by the third photolithography process after forming the second metal thin film to form the source electrode and the drain electrode of the source line as well as the TFT and in addition, etch-removing by dry etching the ohmic contact film protruding from the source line, source electrode, and drain electrode, (a-4) patterning the second insulating film and the first insulating film in the fourth photolithography process after forming the second insulating film, and forming a pixel contact hole that penetrates at least to the drain electrode surface, the first contact hole that penetrates to the first metal film surface, and the second contact hole that penetrates the second metal film surface, and (a-5) patterning the conductive thin film and forming the pixel electrode by the fifth photolithography process after forming the conductive thin film.

9 Claims, 18 Drawing Sheets

FIG. 18(a) *PRIOR ART*
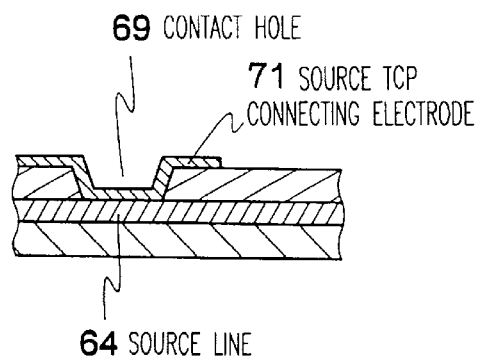
FIG. 18(b) *PRIOR ART*
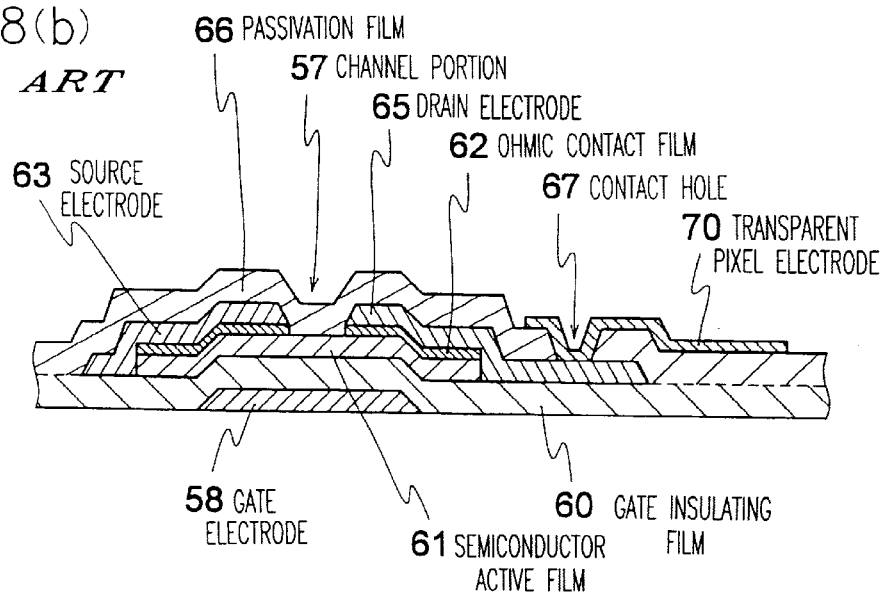
FIG. 18(c) *PRIOR ART*
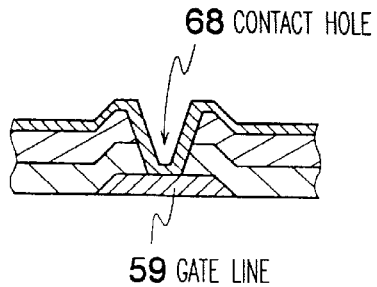

METHOD FOR MANUFACTURING ELECTRO-OPTIC ELEMENT

BACKGROUND OF THE INVENTION

The present invention relates to a method for manufacturing LCD (liquid crystal display) of the active matrix type with TFT (thin film transistor) used for a switching element, and more specifically to a method for manufacturing the active matrix type liquid crystal display using TFT (TFT-LCD) with improved display characteristics and productivity by forming the TFT array substrate with little point defect and line defect through five photo-lithography processes.

The LCD, an electro-optic element using liquid crystal, has been popularly applied to displays. In general, the electro-optic element using liquid crystal has a construction in which a liquid crystal layer comprising liquid crystal is interposed between two substrates with electrodes provided on the top and the bottom surfaces, respectively, and in addition, polarizer are installed to the top and bottom of the two substrates, and in the case of a transmissive type, a back-light is provided on the back surface. The surface of the top and bottom substrates provided with the electrode is subject to so-called alignment treatment, and the director which expresses the direction of the liquid crystal molecules in average is controlled to a desired initial state.

The liquid crystal has a property of double refraction, and the light impinged through the polarizer from the back light is changed to an elliptically polarized light by refraction and is impinged on the polarizer on the opposite side. Under this condition, applying voltage across top and bottom electrodes changes the director arrangement condition and changes the double refractive index of the liquid crystal layer, and changes the elliptically polarized light condition impinged on the polarizer on the opposite side, thereby producing an electro-optic effect in that the light intensity and spectrum penetrating the electro-optic element change. This electro-optic effect differs in accord with the type of liquid crystal phase (nematic phase, smectic phase, cholesteric phase, etc.), initial alignment condition, direction of polarization axis of polarizer, thickness of liquid crystal layer, or color filter or various interference films provided on the path on which light penetrates, but these are reported in detail by known references. In general, the construction called TN (twisted nematic) or STN (super twisted nematic) using the nematic liquid crystal phase is employed.

For the electro-optic element for display using liquid crystal, there are simple matrix type LCD and TFT-LCD which uses TFT as a switching element. TFT-LCD which has characteristics superior to CRT or simple matrix type LCD in terms of portability and display quality has been popularly commercialized as notebook-size personal computers, etc. In TFT-LCD, in general, the liquid crystal layer is interposed between the TFT array substrate and opposite substrate. On the TFT array substrate, TFT is formed in a form of array. On the opposite substrate, common electrode and color filter are mounted. On the outside of this kind of TFT array substrate and the opposite substrate, a polarizer is provided, respectively, and in addition, on one side, a back light is provided. With this kind of construction, satisfactory color display is able to be obtained.

However, in TFT-LCD, it is necessary to fabricate the TFT array substrate in which TFT is shaped in the form of array on the glass substrate using the semiconductor technique, and there are problems in that a great number of processes are required and at the same time various defects are likely to occur. For example, in manufacturing TFT-LCD of the VGA (video graphics array) specification, it is necessary to fabricate on the glass substrate at least 921,600 pieces of TFT, 480 pieces of gate line for scanning and choosing each TFT line-sequentially, and 1,920 pieces of source line for providing signal potential for writing in the pixel electrode, and in addition, the gate line and source line are fabricated nearly in the intersecting state. Consequently, there are problems that various display defects are apt to cause display defects including disconnection of gate line, disconnection of source line, short circuit between gate line and source line, defects due to defective TFT, etc. The need for a large number of processes for fabricating TFT not only causes induction of defects but also gives rise to problems of increased number of apparatus necessary for manufacturing and high manufacturing cost.

In addition, for TFT-LCD, because the gate line and source line to be used are generally fabricated by patterning metal thin film, and the line portion does not transmit the light. Consequently, there is a problem in that of the TFT-LCD surface, the ratio of the area in which electro-optic effects can be utilized, that is to say, the aperture ratio, is reduced, and the efficiency for light utilization of the back light is low.

In TFT-LCD, because the parasitic capacity exists in TFT used for switching, a phenomenon in that the display signal is applied from the source line and the potential written to the pixel electrode varies occurs when TFT changes from the ON state to the OFF state. This is a phenomenon called "field through", and the rate of potential change dVgd is expressed as $dVgd=(Vgl-Vgh)\times(Cgd/(Cgd+Cpix))$ in the case the gate select signal potential (potential of the gate select signal) applied to TFT be Vgh, unselected potential Vgl, parasitic capacity between the TFT gate electrode and drain electrode Cgd, the load capacity of pixel electrode Cpix. When a large DC voltage is applied to the liquid crystal layer, impurities in the liquid crystal may be absorbed to the polyimide film used for alignment, treatment, or polyimide film is subjected to poling, thereby changing the voltage-transmittance characteristics of electro-optic element and giving rise to image tricking of the display. Consequently, the electro-optic element using liquid crystal is driven by the alternate current with voltage polarity applied to the liquid crystal reversed for every frame for line-sequentially of all gate lines, and it is desired to bring the DC potential of the common electrode potential of the opposite substrate to the nearly equivalent level of the DC potential of pixel potential. However, because Cpix contains the liquid crystal capacity and Cpix varies according to the effective voltage applied, dVgd varies according to the display signals, and the DC potential of the pixel potential varies according to the display signals.

As against this, the common electrode of the opposite substrate is the electrode in common to all the pixels and it is natural that the electrode can secure a constant DC potential only, and varying DC potential is applied to the liquid crystal while being dependent on the display signals. The difference d(dVgd) by the display signal of DC potential of this pixel potential becomes maximum between the states with the minimum and the maximum dielectric constants, and when TN or STN is used for the alignment condition of the liquid crystal, it becomes maximum between the display signals applied with the smallest effective voltage and with the largest effective voltage in the display signals.

For a method to reduce d(dVgd) and manufacture displays free of image tricking, there are (1) a method for using TFT with small Cgd or (2) a method for reducing the change rate of Cpix between display signals by adding auxiliary capacity Cs in parallel to the liquid crystal capacity, and others. In order to achieve TFT with small Cgd, it is necessary to reduce the overlap between the pixel electrode of TFT and the drain electrode connected to the gate electrode, giving rise to a problem in that the overlapping accuracy between layers in the patterning process using the photolithography technique (hereinafter called "photolithography process"). In order to add the auxiliary capacity, there needed is a measure either for providing a new auxiliary capacity electrode to the TFT array substrate and bring it to face to the pixel electrode with the insulating film in-between, or to face the pixel electrode with the insulating film put in-between to the gate line scanned one scanning period before than the gate line of the preceding stage, that is, the gate line for scanning a TFT. In the case of the former, there is a problem of a reduced aperture ratio when the auxiliary capacity electrode is formed with metal thin film because an auxiliary capacity electrode is newly provided. In the case of latter, there is a problem of degrading the display quality because the display signals are not sufficiently written in the pixel electrode since the capacity loaded to the gate line increases, delay of gate selection signal occurs, and effective selection time is shortened.

When the TFT array of TFT-LCD is manufactured by divide-exposure with a generally used stepper, since the overlapping condition between layers differ from one divide-exposure region to the other, the parasitic capacity Cgd of TFT varies, and dVgd varies from one divide-exposure region to the other. As a result, since the DC potential of image electrode differs from one divide-exposure region to the other, difference is generated in the effective voltage applied to the liquid crystal, producing a problem of generating so-called variation in shots in which the transmission factor of the electro-optic element using the liquid crystal differs from one divide-exposure region to the other.

For a method to reduce the difference of transmission factor between divide-exposure regions, there are (1) method for improving the interlayer overlapping accuracy between divide-exposure regions to reduce the difference of Cgd between divide-exposure regions, (2) a method for increasing Cgd and reducing the relative change rate of Cgd when an interlayer overlapping difference is generated between divide-exposure region, and (3) a method for adding an auxiliary capacity Cs in parallel to the liquid crystal capacity to increase Cpix and reducing the change of dVgd when Cgd is varied when an interlayer overlapping difference is generated between divide-exposure regions. In order to improve the interlayer overlapping accuracy between divide-exposure regions, there is a problem of improving the positional accuracy of the exposure apparatus or accuracy of photomask. At this point, there is a problem in that it is possible to increase Cgd by increasing the overlapping between the TFT gate and drain electrode connected to the pixel electrode, but image tricking tends to occur because the d(dVgd) increases. In order to add the auxiliary capacity, any of the following measures is required: (1) an auxiliary capacity electrode is newly provided for the TFT array substrate and bring it to face to the pixel electrode with the insulating film put in-between, or (2) the pixel electrode must be faced to the gate line previously scanned and selected with the insulating film put in-between. In the case of the countermeasure (1), because the auxiliary capacity electrode is provided newly, there is a problem of small aperture ratio when the auxiliary electrode capacity is formed using metal thin film. In the case of the countermeasure (2), there is a problem in that the display quality is degraded because the capacity applied to the gate line increases, delay of gate selection signal occurs, the display signal is not sufficiently written in the pixel electrode due to shortened effective selection time, and others.

TFT-LCD has a problem in that the luminance distribution increases in the display element plane because the pixel potential varies due to leak current with TFT in the OFF state during unselected time or leak current to the opposite electrode via the liquid crystal. For a technique to reduce changes of pixel potential during this unselected time, there are methods (1) for increasing OFF resistance of TFT, (2) for increasing electric resistance of liquid crystal, (3) for reducing a change rate of pixel potential by leak current by adding auxiliary capacity Cs in parallel to the liquid capacity to increase Cpix, and others. However, OFF resistance means the resistance between the source electrode and the drain electrode in the case the gate signal is lower than the threshold voltage of TFT (when TFT is in the unselected state). Examples for increasing OFF resistance of TFT include countermeasures (1) for providing the offset structure or LDD (lightly doped domain) region for alleviating the field concentration at the source and drain edges of TFT, (2) for reducing the trap state density inside the band of amorphous silicon film (a-Si film), (3) for reducing the trap state density of the channel interface of the a-Si film and the back channel interface on the opposite side of the channel, (4) for reducing the ratio of channel width W to channel length W/L, and so forth. In order to provide the offset structure or LDD region, a micromachining technique or a technique to accurately control the concentration distribution of impurities to a-Si are required, creating a problem of increasing the complexity of process and structure.

The trap state density in the band of the a-Si film can be reduced by optimizing the film-forming condition or carrying out termination treatment in which hydrogen or fluorine is added to the dangling bond of silicon after film formation. In the known techniques, when the film-forming rate is reduced more than the present film-forming conditions, refined crystallization results, and the OFF resistance is, in turn, reduced, and is possibly in the physical limit state. The latter requires a process for termination treatment in which hydrogen or fluorine is added to silicon dangling bond, giving rise to a problem of complicated process. In order to reduce the trap state density of the channel interface of the a-Si film and the back channel interface opposite to the channel, there taken are countermeasures (1) for optimizing the composition of gate insulating film material and the film forming method, or (2) for optimizing the composition of passivation film material or film-forming method, or others.

These method for improving the OFF characteristics of TFT are reported in detail by known references, but all have problems such as increased complexity of the process. Because to reduce W/L, ratio of channel width W to channel length L, means to reduce the ON current at the same time, there is a problem of degrading the display quality since the display signals are not sufficiently written in the pixel electrode. To increase the resistance of the liquid crystal layer can be achieved by reducing the concentration of impurities of the liquid crystal material or selecting the material which reduces resistance less when moisture or other impurities are taken in, but there still remains a problem in that the pixel potential varies by the leak current in the TFT OFF state. In order to add the auxiliary capacity, any of the following countermeasures is required: (1) to provide the auxiliary capacity electrode newly to the TFT array substrate and allow it to face to the pixel electrode with the insulating film put in-between or (2) to allow the pixel electrode to face to the gate line previously scaned and selected with the insulating film put in-between. In the case of the former, because the auxiliary capacity electrode is provided newly, there is a problem in that the aperture ratio becomes small when the auxiliary capacity electrode is formed by metal thin film. In the case of the latter, there is a problem in that the capacity applied to the gate line increases, delay in gate select signal occurs, the effective select time is shortened, the display signal is, therefore, unable to be sufficiently written in the pixel electrode, and the display quality degrades.

In TFT-LCD, it is necessary to input electrical signals to the gate line, source line, auxiliary capacity line, etc., and these lines must be pulled out to the periphery of the display portion to form a connecting terminal with the signal output. In general, TCP (tape carrier package) with a driving IC loaded is connected to the connection terminal formed on the TFT array substrate using anisotropic conducting film. The TFT array substrate surface of the display portion is isolated from the atmosphere by affixing the circumference of the display portion to the opposite substrate with the adhesives such as epoxy resin, but the TCP connection terminal portion, which is a connecting terminal with TCP, is exposed to the atmosphere. Consequently, there is a problem in that the TCP connecting terminal portion comprising conductive thin film is corroded by the moisture content in the atmosphere.

For these problems, a process for manufacturing TFT array which can reduce the generation of disconnection of source line and at the same time can reduce short-circuiting between the gate line and the source line is disclosed in Japanese Unexamined Patent Publication No. 97386/1985. In addition, a process for manufacturing TFT array for reducing the number of processes and comprising five photolithography process is disclosed in Japanese Unexamined Patent Publication No. 50308/1996. Furthermore, a process for manufacturing TFT array that can improve the moisture resistance at connections between TCP and the connecting terminal is disclosed by Japanese Unexamined Patent Publication No. 92496/1995.

FIG. 16 and FIG. 17 are the cross-sectional illustration of the principal portion and plan illustration of the display pixel of the conventional TFT array substrate disclosed in Japanese Unexamined Patent Publication No. 97386/1995, respectively. In FIG. 16 and FIG. 17, numeral 45 designates a gate electrode, 46 an auxiliary capacity electrode, 47 a gate insulating film, 48 a semiconductor layer, 49 a pixel electrode, 50 a source electrode, 51 a drain electrode, 52 a gate line, 54 a channel portion, and 56 a source line.

In this conventional example, the manufacturing process is not disclosed in detail, but according to the disclosed drawings, it is assumed to be manufactured in the method as described below. First of all, on a insulating substrate, first conductive thin film is formed. Then, in the first photolithography process, the first conductive thin film is patterned and the gate electrode 45 and the auxiliary capacity electrode 46 are formed. Then, the gate insulating film 47 and the semiconductor layer 48 are laminated. Then, in the second photolithography process, the semiconductor layer is patterned in such a manner that a continuous profile is achieved from the portion on which the source electrode 50 is formed to the portion on which the TFT channel is formed, and a semiconductor layer 48 of a desired profile is formed. Then, in the third photolithography process, the second conductive thin film is patterned to form the pixel electrode 49. Next, the third conductive thin film comprising alloys composed with aluminum, silicon is formed. Then, in the fourth photolithography process, the third conductive thin film is patterned to form the source electrode 50 and the drain electrode 51. Then, though it is not clear from the drawings attached to Japanese Unexamined Patent Publication No. 97386/1985, in the fifth photolithography process, the gate insulating film is patterned and the contact hole for connecting the gate line to gate-side driving IC is formed.

In this conventional example, a method for manufacturing the TFT array comprising five processes containing the photolithography process, respectively, in this way is disclosed. For the effects, it is described that by making a semiconductor layer be a semiconductor layer 48 formed in a continuous profile from the portion where the source electrode 50 is formed to the portion where the TFT channel is formed, generation of disconnection of source line can be reduced, short-circuiting between the gate line and the source line can be reduced, and the contact resistance between the source electrode and the semiconductor layer in TFT can be reduced.

FIGS. 18(a), 18(b) and 18(c) show cross-sectional illustrations of the main portion of the TFT array substrate manufactured in the fifth photolithography process disclosed in the seventh embodiment of Japanese Unexamined Patent Publication No. 50308/1996. FIG. 18(a) shows a main portion of the source TCP connecting electrode, FIG. 18(b) a main portion of the display pixel, and FIG. 18(c) part of gate line. In FIGS. 18(a), 18(b) and 18(c), numeral 57 designates a channel portion, 58 a gate electrode, 59 gate line, 60 a gate insulating film, 61 a semiconductor active film, an ohmic contact film, 63 a source electrode, 64 a source line, 65 a drain electrode, 66 a passivation film, 67, 68, and 69 contact holes, 70 a transparent pixel electrode, and 71 a source TCP connecting electrode.

In this conventional example, first, on a transparent substrate, the first conductive metal thin film of chromium, molybdenum, aluminum is formed about 100 nm thick. Then, in the first photolithography process, the first conductive metal thin film is patterned and the gate electrode 58 and the gate line 59 are formed In this event, in the case the first conductive metal thin film is chromium, wet etching treatment is carried out using an etchant comprising, for example, $(NH_4)_2[Ce(NH_3)_6]$ and $HNO_3$ and $H_2O$. Then, for the first insulating film, the SiNx film, for the semiconductor active film 61, the a-Si film, for the ohmic contact film 62, the $n^+$ a-Si film are laminated to film thickness of about 300 nm, 100 nm, and 20 nm, respectively.

Next, in the second photolithography process, the semiconductor active film 61 and ohmic contact film 62 are patterned in the form of island with the semiconductor portion separated from other portion above the gate electrode. In this event, for example, the semiconductor active film and ohmic contact film are wet-etching treated with the etchant comprising, for example, HF and $HNO_3$. Then, the second metal thin film comprising titanium is formed about 300 nm in thickness.

Next, in the third photolithography process, the second metal thin film and ohmic contact film are patterned to form the source electrode 63, source line 64, drain electrode 65, and channel portion 57. In this event, for example, the second metal thin film and ohmic contact film are wet-etching treated with the etchant comprising, for example, HF and $H_2O$. Then, the passivation film 66 is formed about 400 nm in thickness by the methods such as the plasma CVD method.

Then, in the fourth photolithography process, the passivation film is patterned to form a contact hole 67 connecting to the drain electrode 65, a contact hole 67 connecting to the gate line 59, and a contact hole 69 connecting to the source line 64. In this event, the passivation film is etching-treated by dry etching using etching gas comprising, for example, $SF_6$ and $O_2$. Then, a transparent conductive film comprising ITO (indium tin oxide) is formed about 150 nm in thickness.

Then, in the fifth photolithography process, a transparent conductive film is patterned and a terminal for connecting the transparent pixel electrode 70 and the source line is formed. In this event, for example, using the etchant comprising, for example, HCl and $HNO_3$ and $H_2O$, the ITO film is wet-etching treated.

In this conventional example, a method for manufacturing the TFT array in five processes, each containing the photolithography process, is disclosed, and as the effect, it is stated that because the number of processes can be shortened to five processes, each containing the photolithography process, the yield is improved and manufacturing cost is reduced, and because there is no passivation film on the transparent pixel electrode, voltage can be efficiently applied to the liquid crystal layer, and because the transparent pixel electrode and source line and gate line are formed separated by the insulating film, respectively, there is no fear of generating short-circuiting among source lines or gate lines due to defective formation of the transparent pixel electrode.

For the effects of this conventional example, there described are (1) when the first conductive metal thin film is formed using the laminated film with metal thin film and the barrier film comprising the material difficult to be oxidized or the material which is to be solid-solution as conductive oxide for the transparent conductive film, the barrier film further takes oxidation prevention effect and the contact capability of these films with other conductive films can be secured, and the problem of delayed signal is difficult to occur, and (2) the use of aluminum or tantalum with good conductivity as metal thin film can decrease the film thickness of the metal thin film, improve the step coverage of the whole TFT element, and the yield can be improved.

FIG. 19 shows the cross-sectional illustration of the main portion of the contact terminal portion with TCP of the conventional TFT array substrate disclosed in Japanese Unexamined Patent Publication No. 92496/1995. In FIG. 19, numeral 72 designates the undercoat film, 73 a lead-out electrode, 74 a gate insulating film, 75 a transparent conductive film, 76 an insulating protection film, and 77 a TCP connection range.

In this conventional example, first of all, on the overall insulating substrate, the undercoat film 72 comprising silicon dioxide ($SiO_2$) or tantalum oxide (TaOx) is formed. Then, the first metal thin film comprising aluminum or aluminum alloy is formed, and patterned in the first photolithography process to form the lead-out electrode 73. Then, the gate insulating film 74 is formed on the whole surface. Next, above the gate electrode comprising the first metal thin film of TFT portion provided to the display pixel, the silicon semiconductor layer and interlayer insulating film for channel protection film are formed.

Then, in the second photolithography process, above the gate electrode, the channel protection film is patterned. Then, $n^+$ silicon film is formed.

In addition, in the third photolithography process, the $n^+$ silicon film of the TFT portion and silicon semiconductor layer are patterned. Then the transparent conductive film is formed.

Then, in the fourth photolithography process, the transparent conductive film 75 is patterned so as to remain on the peripheral portion of the display electrode of the pixel portion and lead-out electrode 73. Then, the second metal thin film comprising titanium or aluminum is formed for the source electrode and drain electrode of the TFT portion provided to the display pixel, and in the fifth photolithography process, the film is patterned. Then, the insulating protection film 76 is formed, and in the 6th photolithography process, an opening portion is formed at the lead-out electrode portion by dry etching. TCP is connected to the position slightly deviated from the opening portion of the lead-out electrode portion to the side opposite to the display portion according to the disclosed drawings.

In this conventional example, a method for manufacturing TFT array substrates forming the TCP connecting terminal portion in the manufacturing process including six photolithography processes in this way, and as the effects, it is stated that disconnection of the lead-out electrode can be eliminated by stopping the propagation of corrosion of the first metal thin film generated from the opening portion of the lead-out electrode by the gate insulating film and the transparent conductive film installed to the peripheral portion of the lead-out electrode.

When the TFT array is manufactured using the conventional technique disclosed in Japanese Unexamined Patent Publication No. 97386/1985, it is necessary to form the semiconductor film 48, pixel electrode 49, are source electrode 50 in the same layer on the gate insulating film. Due to defective patterns generated in actual manufacturing process, there generated are troubles in that defects are apt to occur because short-circuiting occurs between pixel electrode and source line or short-circuiting occurs between the semiconductor layer and the pixel electrode. Short-circuiting between the pixel electrode and the source line appears as point defect at the time of display, while short-circuiting between the semiconductor layer and the pixel electrode appears as point defect when light is irradiated.

In this conventional technique, because the TFT channel portion is exposed, the TFT OFF current increases, giving rise to nonconformity in that the display quality is degraded. In addition, line of the auxiliary capacity electrode is unknown in the range of the detailed explanation disclosed in this conventional technique, and in the case the electrode is formed with known technique as common electrode, a contact hole for connection with the third conductive thin film must be formed in the periphery of the display portion. In this event, one photolithography process is added and a total of six photolithography processes were required.

In the conventional technique disclosed in Japanese Unexamined Patent Publication No. 50308/1996, when the TFT array is manufactured by the illustrated process, there occurred is nonconformity in that pin hole is generated because the silicon nitride (SiNx) film which is the first insulating film of the bottom layer portion of the area free of the semiconductor active film and ohmic contact film is also subject to the etchant when wet-etching treatment is carried out with the etchant comprising HF and $HNO_3$ when the semiconductor active film 61 and ohmic contact film 62 are patterned above the gate electrode in the form of island with the semiconductor portion separated from other portions. And nonconformity was generated in that the first insulating SiNx film of the bottom layer portion around the pattern of the left semiconductor active film and ohmic contact film are etched, the profile of the semiconductor active film and ohmic contact film becomes the flaw and causes stepping (the second metal thin film causes tearing of pattern with the step difference as a boundary where there is a step difference).

There is nonconformity in that the etchant is likely to penetrate in the step difference portion around the patterns of semiconductor active film and ohmic contact film when the second metal thin film is patterned by the wet etching treatment even when the semiconductor active film 61 and the ohmic contact 62 are dry-etching treated when the semiconductor active film 61 and the ohmic contact 62 are patterned above the gate electrode and in the form of island with the semiconductor portion separated from other portions in the second photolithography process. In particular, there is nonconformity in that the so-called stepping markedly occurs when the standing time from film-forming of the second metal thin film to the photolithography process is not shortened.

In the third photolithography process, in the case the second metal thin film and ohmic contact film are subjected to wet-etching with the etchant comprising HF and $H_2O$ when the second metal thin film and ohmic contact film are patterned to form the source electrode 63, source line 64, drain electrode 65, and channel portion 57, a process for wet-etching treating the semiconductor active film and ohmic contact film is required. In this process, pinholes are generated because the first insulating SiNx film of the bottom layer portion in the region where no semiconductor active film and ohmic contact film remain are also exposed to the etchant. In addition, of the circumference of patterns of the left semiconductor active film and ohmic contact film, the first insulating SiNx film of the bottom layer portion where no source electrode 63 and drain electrode 65 are left is etched and the profile of the semiconductor active film and the ohmic contact film becomes a flaw, and because this flaw portion is unable to sufficiently cover with the passivation film, the OFF current of TFT increases, and the display quality may be degraded. There occurs nonconformity in that the pixel transparent electrode generates stepping around the pattern of the semiconductor active film and ohmic contact film to generate a defect, or the electrochemical reactions rapidly take place, the second metal thin film dissolves, and disconnection of source line and source electrode is generated, the transparent electrode dissolves to generate defects when a specified signal voltage is applied to TFT array to drive due to the remaining etchant at the flaw portion around patterns of the semiconductor active film and ohmic contact film.

Because to the TFT array substrate manufactured by using the process for manufacturing disclosed in the 7th embodiment of Japanese Unexamined Patent Publication No. 50308/1996, no auxiliary capacity is provided in parallel to the liquid crystal capacity (capacity formed with the liquid crystal material put in-between the display pixel electrode and the opposite substrate), there generated is nonconformity with respect to display quality in which the display causes image tricking or the display causes luminance distribution.

When the TFT array substrate is manufactured using the conventional technique disclosed in Japanese Unexamined Patent Publication No. 92496/1995, according to the disclosed drawings, because TCP is connected to the position slightly deviated to the side opposite to the display portion from the opening portion of the lead-out electrode portion, corrosion of the first metal thin film tends to develop from the portion not covered with TCP of the opening portion of the lead-out electrode due to the influence of humidity. There generated is nonconformity in that though this corrosion may be stopped by the gate insulating film and transparent conductive film provided on the periphery of the lead-out electrode in a short term, but in the long term, it results in disconnection, or connection resistance increases between TCP and the display portion line, if not disconnection, and changes in display characteristics is brought about due to signal distortion.

In the conventional technique, in order to form the transparent conductive film with high reliability to the electrical probing at the TCP connecting terminal portion, it is necessary to add photolithography processes for forming the transparent conductive film after fabricating the construction disclosed in FIG. 19, and patterning this film. Consequently, in the range of the disclosed technique, there generated is nonconformity in which erroneous judgment is likely to result in because the first metal thin film must be directly probed when a process is applied for providing electric probing at the TCP connecting terminal portion with the inspection apparatus after fabricating the TFT array substrate, inspecting the TFT characteristics of the display portion, and screen-eliminating defective substrates to reduce the quantity of opposite substrates. And even in this conventional example, six photolithography processes are required.

SUMMARY OF THE INVENTION

An object of the present invention is to solve the problems mentioned above, and to provide a method for manufacturing electro-optic elements according to this invention comprising a display pixel having a pixel electrode to which a TFT is electrically connected is formed on the first insulating substrate in the form of array, TFT array substrate in which gate line for scanning each TFT line-sequentially and source line providing the signal potential to be written in the pixel electrode are formed in the state of intersecting at right angles each other in the matrix form, the opposite substrate on which the color filter and the common electrode are formed on the second insulating substrate, wherein the TFT array substrate and the opposite substrate are affixed with the liquid crystal layer interposed in-between, and polarizers which are placed at the top of the TFT array substrate and at the bottom of the opposite substrate, respectively, the method comprising steps of:

(a-1) forming gate electrodes of the gate line and the TFT by patterning the first metal thin film by the first photolithography process after forming the first metal thin film on the first insulating substrate, (a-2) patterning by dry etching the semiconductor active film and the ohmic contact film by the second photolithography process in the larger and continuous form than the portion in which the source line and the TFT are formed after forming the first insulating film, semiconductor active film, and ohmic contact film, (a-3) patterning the second metal thin film by the third photolithography process after forming the second metal thin film to form the source electrode and the drain electrode of the source line as well as the TFT and in addition, etch-removing by dry etching the ohmic contact film protruding from the source line, source electrode, and drain electrode, (a-4) patterning the second insulating film and the first insulating film in the fourth photolithography process after forming the second insulating film, and forming a pixel contact hole that penetrates at least to the drain electrode surface, the first contact hole that penetrates to the first metal film surface, and the second contact hole that penetrates the second metal film surface, and (a-5) patterning the conductive thin film and forming the pixel electrode by the fifth photolithography process after forming the conductive thin film.

It is desirable that the source electrode is formed on the gate line of the source line extending from the portion other than the intersecting portions between the gate line and the source line, because the source electrode is cut off by laser irradiation to get rid of the influence of defects of the TFT portion of the display pixel on other display pixels when any defect is generated on TFT of the display pixel.

It is desirable that the source electrode is formed on the gate line of the source line extending from the intersecting portions of the gate line and the source line, because an electro-optic element with a large aperture ratio can be manufactured since the gate line does not exceed the pattern edges and short-circuiting between the source electrode and the gate line at the gate line pattern edges can be eliminated, and at the same time the area required for providing the source electrode of the TFT portion can be minimized.

It is desirable that to each of the display electrodes, auxiliary capacity formed between one electrode and the other electrode via a dielectric substance in parallel with the capacity formed between the pixel electrode and the common electrode via the liquid crystal layer, and either one of the electrodes is the pixel electrode and the dielectric substance is a laminated film comprising the first insulating film and the second insulating film because short-circuiting of the auxiliary capacity does not occur even when any pinhole is generated in either of the insulating film.

It is desirable that the other electrode is the auxiliary capacity electrode and the auxiliary capacity line comprising the first metal thin film, and the auxiliary capacity electrode and the auxiliary capacity line are formed simultaneously with the gate electrode and the gate line because an electro-optic element with high display quality can be obtained since the gate line and the independent auxiliary capacity line can be formed without increasing the number of the photolithography process and the distortion of signals inputted to the auxiliary capacity line can be reduced.

It is desirable that the other electrode is part of the gate line scanned one scanning period before the gate line for scanning the TFT connected to the pixel electrode, one of the electrodes of the gate line, because an electro-optic element with a large aperture ratio can be obtained since no auxiliary capacity line for special purpose is required.

It is desirable that the display portion lead-out line is formed outside the display area with the display pixels formed in an array, the display portion lead-out line comprising the gate-side lead-out line and the source-side lead-out line, the gate-side lead-out electrode connects the driver output connecting terminal comprising TCP loaded with the driver IC for installing to input the signal potential to the gate line and the gate line, and the source-side lead-out electrode connects the driver output connecting terminal of TCP loaded with the driver IC for providing to input the signal potential to the source line and the source line, and the gate-side lead-out electrode is formed in the profile continuing from the gate line by patterning the first metal thin film, and the source-side lead-out electrode is formed in the profile continuing from the source line by patterning the second metal thin film, because the electric resistance of an area from the driver output terminal portion to the TFT portion can be reduced as well as a construction with high reliability can be obtained since the gate line and source line can be formed up to the driver output connecting terminal portion without inter-layer contact.

It is desirable that (b-1) the construction of the driver output connecting terminal connecting to the gate-side lead-out line is the construction in which the first insulating film, the second insulating film, and the conductive thin film are laminated on the first metal thin film, and the first metal thin film and the conductive thin film are electrically connected with the first contact hole, and the first contact hole is covered with the anisotropic conductive film which connects the TCP to the driver output connecting terminal on the gate line side, (b-2) the construction of the driver output connecting terminal connecting to the source-side lead-out line is the construction in which the first insulating film, the second metal thin film, the second insulating film, and the conductive thin film are laminated on the first metal thin film, and the first metal thin film and the second metal thin film and the conductive thin film are electrically connected with the second contact hole, and the second contact hole is covered with the anisotropic conductive film, because the reliability to humidity can be improved since the contact hole formed at the driver output connecting terminal portion is completely covered with resin of the anisotropic conductive film.

It is desirable (c-1) to form the gate-side preliminary line which is a laminated structure by patterning the second metal thin film as well as the semiconductor active film, and the ohmic contact film in such a manner to intersect with the gate-side lead-out line, (c-2) to form the counter-gate-side preliminary line which is a laminated structure by patterning the second metal thin film as well as the semiconductor active film and the ohmic contact film on the side opposite to the side on which the gate-side lead-out line is formed, (c-3) to form the source-side preliminary line formed by patterning the first metal thin film in such a manner to intersect with the source-side lead-out line, and (c-4) to form the counter-source-side preliminary line formed by patterning the first metal thin film in such a manner to intersect with the source line formed by extending on the side opposite to the side in which the source-side lead-out line in the display region is formed, to allow the gate-side preliminary line, the source-side preliminary line, the counter-source-side preliminary line, and counter-gate-side preliminary line to have portions partly overlapping one another, to form the first contact hole and the second contact hole in the vicinity of the overlapping portions, and to form the conductive thin film by patterning in such a manner to electrically connect the first contact hole and the second contact hole, because the disconnected source line can be repaired using the preliminary line.

BRIEF EXPLANATION OF THE DRAWINGS

FIGS. 18(a), 18(b) and 18(c) are cross-sectional views illustrating the display pixel disclosed in Japanese Unexamined Patent Publication No. 50308/1996.

DETAILED DESCRIPTION

Figure 1:
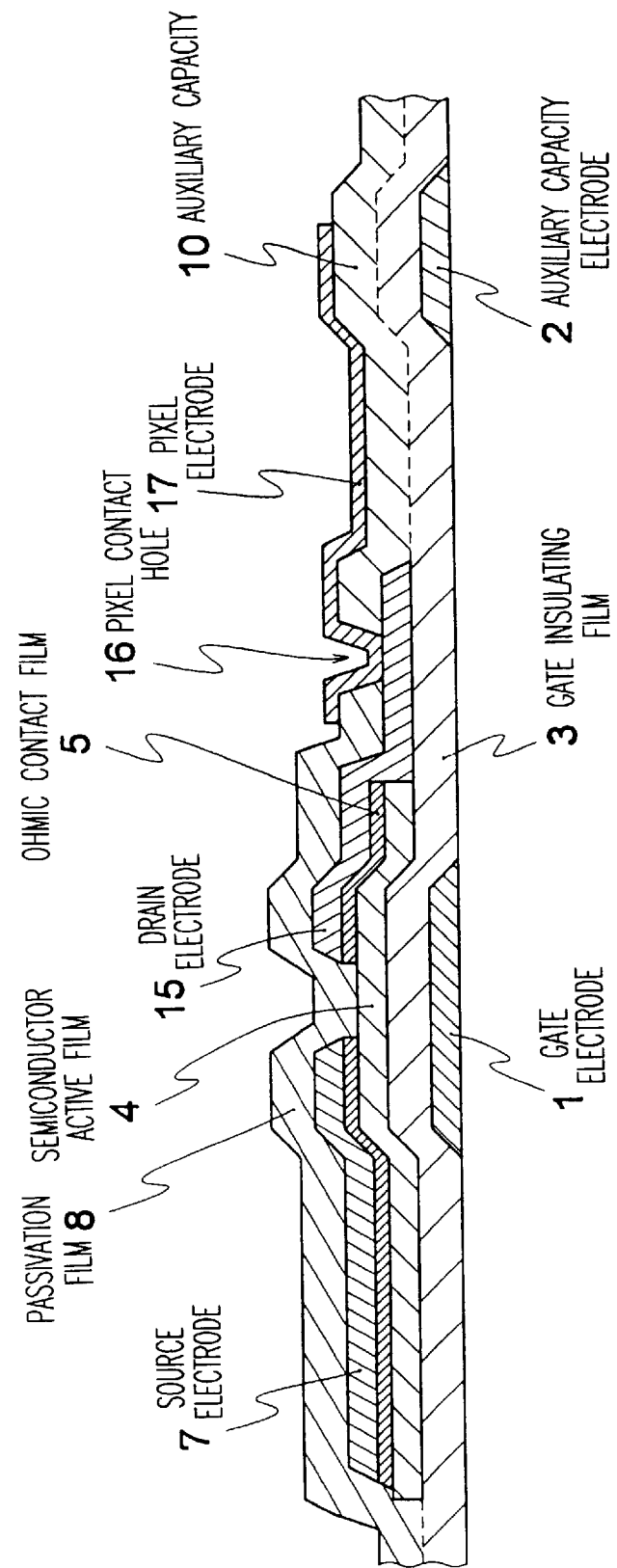
FIG. 1 is a cross-sectional view illustrating main portion of the display pixel related to Embodiment 1, 2, 3, 4 and 5 of the present invention.

Referring now to the drawings, the method for manufacturing the electro-optic element related to the embodiment according to the present invention will be described in detail hereinafter.

Embodiment 1

Figure 2:
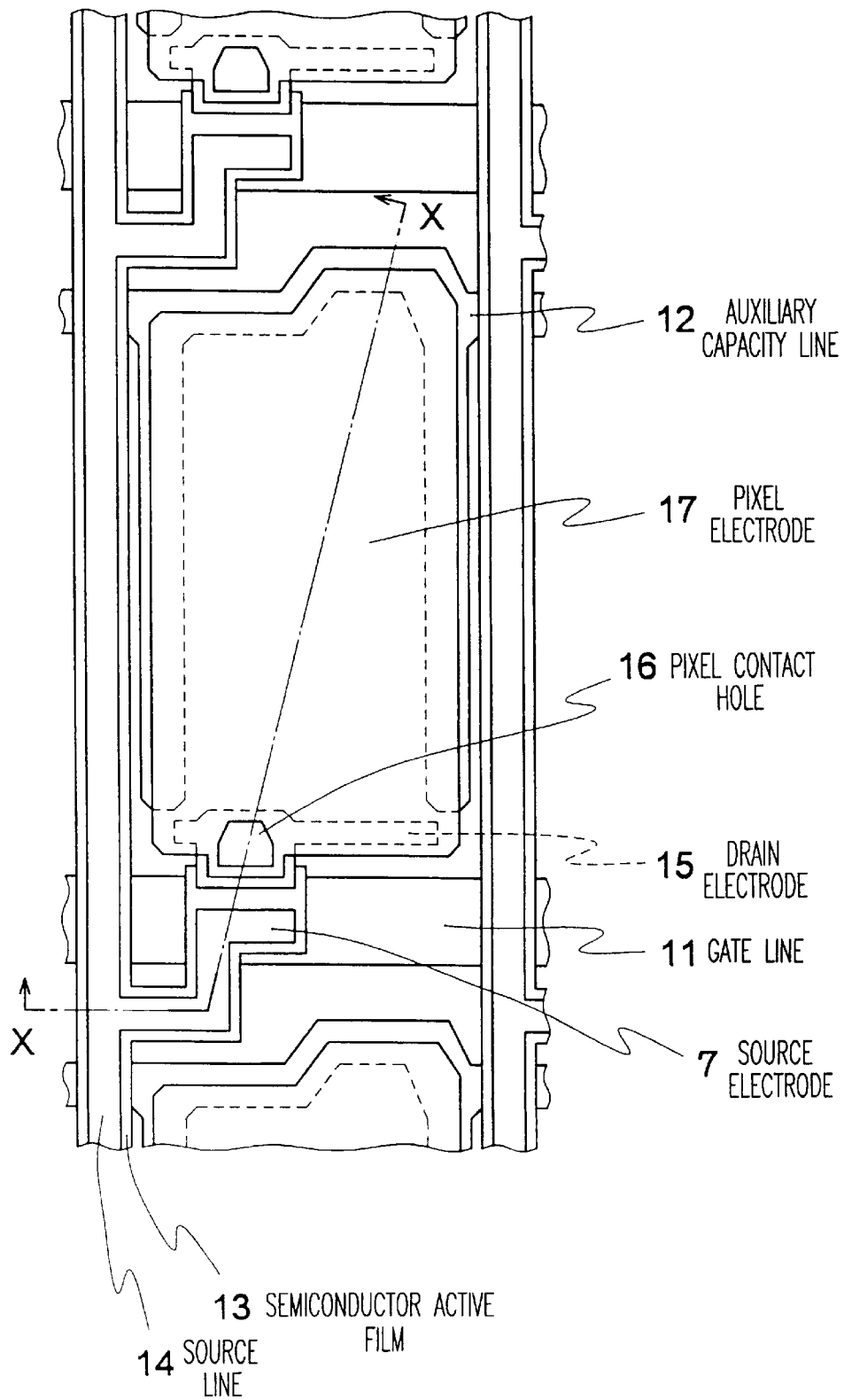
FIG. 2 is a plan view illustrating the display pixel related to Embodiment 1 of the present invention.
Figure 3:
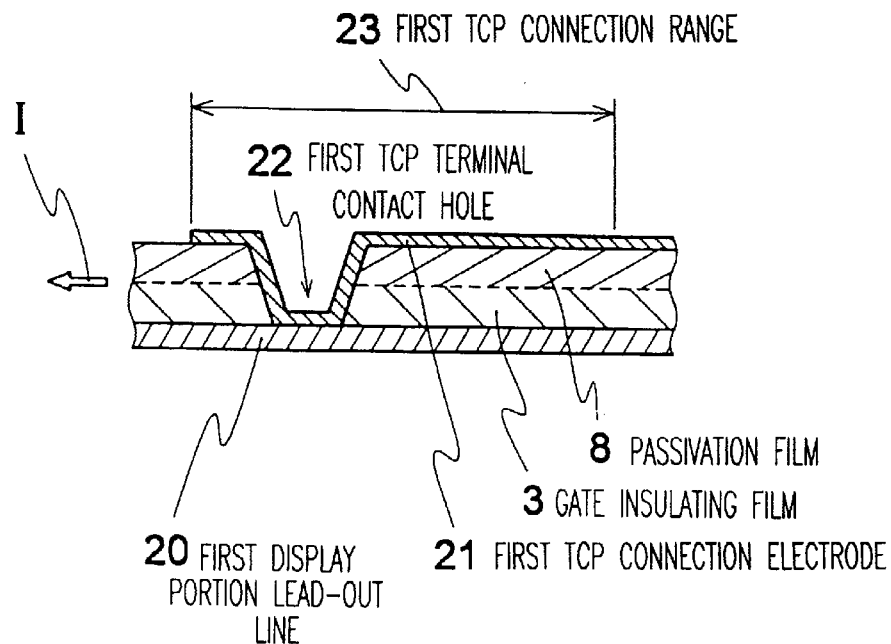
FIG. 3 is a cross-sectional view showing the cross section of the TCP terminal portion formed by the first metal thin film related to embodiments of the present invention.
Figure 4:
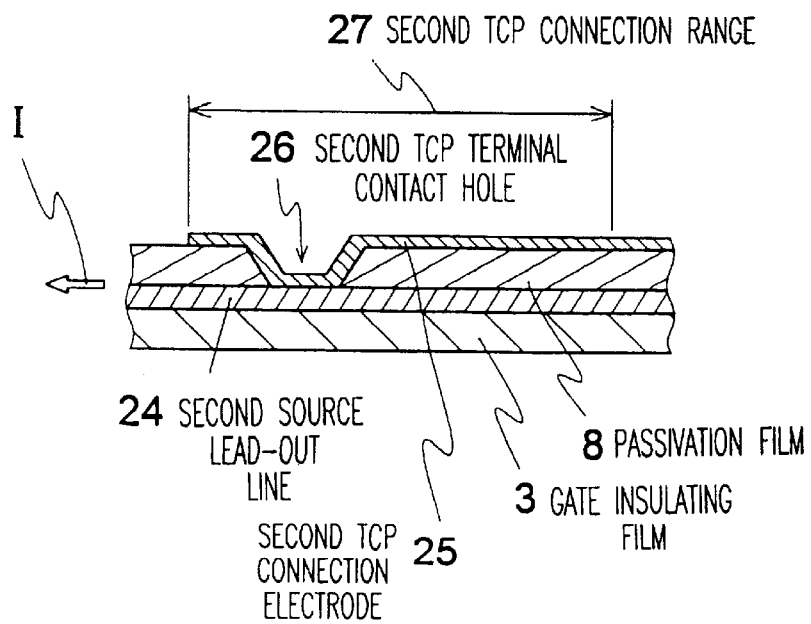
FIG. 4 is a cross-sectional view showing the cross section of the TCP terminal portion formed by the second metal thin film related to embodiments of the present invention.

FIG. 1 and FIG. 2 are a cross-sectional view (indicating the elements on the insulating substrate) and a plan view, respectively, of the main portion of the display pixel manufactured by the method for manufacturing the electro-optical element related to the Embodiment 1 according to the present invention, and the cross-sectional view of FIG. 1 indicates a sectional structure taken along line X—X shown in FIG. 2. FIG. 3 and FIG. 4 are cross-sectional views respectively showing the cross section of the TCP terminal portion provided outside the display region. TCP connects the signal potential source for supplying signal potential to be inputted to the gate line, source line, auxiliary capacity line, and common electrode of the opposite substrate to the gate line, source line, auxiliary capacity line and common electrode.

In FIG. 1 and FIG. 2, numeral 1 denotes a gate electrode, 2 an auxiliary capacity electrode, 3 a gate insulating film, 4 a semiconductor active film, 5 an ohmic contact film, 7 a source electrode, 8 a passivation film, 10 a portion having an auxiliary capacity (hereinafter referred to as "auxiliary capacity"), 11 gate line, 12 auxiliary capacity line, 13 a semiconductor active film and ohmic contact film, 14 source line, 15 a drain electrode, 16 a pixel contact hole, and 17 a pixel electrode. As is the case of the structure shown in the conventional techniques, the gate electrode is an electrode which is part of the gate line or an electrode that serves a terminal to branch off from the gate line and to be connected to each of TFTs. The auxiliary capacity electrode is an electrode which branches off from the auxiliary capacity line and part of which is extended to the position where the electrode overlaps the pixel electrode. Between the auxiliary capacity electrode and pixel electrode, the auxiliary capacity is formed with the laminated film comprising the first insulating film and the second insulating film as dielectric substance. The auxiliary capacity is formed in parallel to the liquid crystal capacity formed via the liquid crystal between the pixel electrode and the common electrode in terms of an electric circuit. The semiconductor active film and ohmic contact film shown with numeral 13 in FIG. 2 are formed in two vertical layers as shown with numerals 4 and 5 in FIG. 1, respectively. Consequently, on the drawing of FIG. 2, the ohmic contact film only I shown but for explanation purpose, it is expressed by the names of both films. However, as shown in FIG. 1, the ohmic contact film protruding from the source electrode, source line, and drain electrode is removed by dry etching as discussed later.

In FIG. 3 and FIG. 4, the display portion lead-out line which is the first gate side lead-out line is designated to numeral 20, the first TCP connection electrode to numeral 21, the first TCP terminal contact hole to numeral 22, the first TCP connection range to numeral 23, the display portion lead-out line which is the lead-out line on the second source side to numeral 24, the second TCP connection electrode to numeral 25, the second TCP terminal contact hole to numeral 26, and the second TCP connection range to numeral 27.

The overall construction of the electro-optic element according to the present invention is the same as that shown in the conventional example. That is, display pixels having pixel electrodes electrically connected with TFTs are formed in the form of arrays on the first insulating substrate, and with the liquid crystal layer interposed between the TFT array substrate in which gate line and source line are formed in nearly intersecting state and in the form of matrix and the opposite substrate comprising the color filter and the common electrode formed on the second insulating substrate, TFT array substrate and the opposite substrate are affixed. In addition, outside the TFT array substrate and the opposite substrate affixed each other, that is, on the top side of the TFT array substrate and on the bottom side of the opposite substrate, polarizers are installed, respectively. It is the same as is the case of the conventional example that the gate line is designed to scan the TFTs line-sequentially, while the source line is designed to provide the writing signal potential to the pixel electrode. To the TFT array substrate, the display portion lead-out line is formed outside the display region. The lead-out line of the display portion is designed to connect the gate line and source line in the display region to the TCP driver output connection terminal loaded with the driver IC provided for inputting the signal potential to the gate line and source line.

Next discussion will be made in detail on the manufacturing method of Embodiment 1.

First of all, for the first insulating substrate, a 0.7 mm thick glass substrate is washed to clean the surface. When the transmission type electro-optic element is formed, a transparent insulating substrate such as glass substrate, etc. is used for the insulating substrate. When a reflection type electro-optic element is formed, it is possible to use the insulating substrate with insulation capability equivalent to that of glass substrate. The thickness of the insulating substrate may be optional, but it is desirable that the thickness of the insulating substrate ranges from about 0.7 mm to 1.1 mm in order to reduce the thickness of the electro-optic element. Because distortion occurs in the substrate by film forming or heat treatment during manufacturing process and nonconformity such as lowering the patterning accuracy is generated in the case the insulating substrate is excessively thin, it is necessary to select the thickness of the insulating substrate with the treatments carried out during the manufacturing process taken into account. When the insulating substrate consists of brittle fracture material such as glass, it is desirable to chamfer the end faces of the substrate from the viewpoint of preventing entry of foreign matter due to chipping from the end faces. It is desirable to provide a notch to part of the insulating substrate to enable identification of the substrate direction from the viewpoint of each process control because the direction of substrate treatment can be specified in each manufacturing process.

Then, the first metal thin film is formed on the glass substrate by the sputtering process. For the first metal thin film, it is possible to use thin film about 100 nm to 500 nm thick comprising at least one of, for example, chromium, molybdenum, tantalum, titanium, aluminum, and copper, or alloys produced by adding traces of other substances to at least one of these metal single substance. Because on the first metal thin film, a contact hole is formed by dry etching in the process later discussed, and in addition, the conductive thin film is formed, it is desirable to use metal thin film difficult to generate surface oxidation or the metal film which has conductivity even if it is oxidized for the first metal thin film, and it is desirable that at least the surface is covered with chromium, titanium, tantalum, or molybdenum. For the first metal thin film, it is possible to use the metal thin film laminated with dissimilar metal thin films or the metal thin film with varying compositions in the film thickness direction.

Next, in the first photolithography process, the first metal thin film is patterned, and the gate electrode 1 and gate line 11 of the TFT, auxiliary capacity electrode 2 and auxiliary capacity line 12, and the first display portion lead-out line 20 are formed in the relevant profiles, respectively. The photolithography process is carried out in order of the following Steps (1) through (4). That is, (1) after washing the TFT array substrate, (2) the photosensitive resist is applied and dried, and then, the substrate is exposed and developed through the mask pattern on which a specified pattern is formed, and the photosensitive resist with the mask pattern transferred onto the TFT array substrate photolithographically is formed, (3) etching is carried out after curing the photosensitive resist by heating, and (4) the photosensitive resist is peeled. In the case the wettability is not fitted to the photosensitive resist and TFT array substrate and crawling is generated, countermeasures are taken, such as UV cleaning carried out before application, or steam-applying hexamethyl disilazan, HMDS, $(CH_3)_3Si-N=N-Si(CH_3)_3$) for improvement of wettability. In the case the adhesion between the photosensitive resist and TFT array substrate is poor and peeling occurs, treatments such as raising the curing temperature by heating or increment of the time are taken. Etching of the first metal thin film is carried out by wet etching using the known etchant (for example, if the first metal thin film comprises chromium, etchant mixed with the ceric nitrate anmon and nitric acid). It is desirable to etch the first metal film in such a manner to have a pattern edge in the tapered profile in view of prevention of short-circuiting at the stepping with other line. Now, the tapered profile means that the pattern edge is etched in such a manner that the cross section forms a trapezoid as seen in the right and left oblique portion of the cross-sectional profiles of the gate electrode 1 shown in FIG. 1. It is shown that the gate electrode 1, auxiliary capacity electrode 2, and first display portion lead-out line 21 are formed in this process, but in addition to these, various marks and line necessary for manufacturing the TFT array substrate are formed.

Next, the first insulating film, semiconductor active film, and ohmic contact film are formed continuously on the glass substrate by the plasma CVD process. For the first insulating film which serves as the gate insulating film 3, SiNx film, SiOy film, SiOzNw film (x, y, z, w are positive numbers, respectively) or laminated film of these are used. The film thickness of the first insulating film is on the order of 300 nm to 600 nm. In the case of thin film thickness, short-circuiting is likely to occur at the intersecting portion between the gate line and source line, and it is desirable to provide the film thickness of the first insulating film more than that of the first metal thin film. When the film thickness is excessively thick, the ON current of TFT becomes small and the display characteristics are degraded, and therefore, it is desirable to hold the film thickness as small as possible.

Examples of semiconductor active film include amorphous silicon (a-Si) film and polycrystalline silicon (p-Si) film. The thickness of the semiconductor active film ranges from about 100 nm to 300 nm. In the case of thin film thickness, loss of the ohmic contact film during dry etching later discussed occurs, and in the case of thick film thickness, the film thickness is selected from the ON current of TFT which requires the controllability of etching depth at the time of dry-etching the ohmic contact film. When the a-Si film is used for the semiconductor active film, it is desirable to form the interface with the gate insulating film with the SiNx film or SiOzNw film from the viewpoint of improving the controllability of Vth of TFT and for improving the reliability. When the p-Si film is used for the semiconductor active film, it is desirable to for the interface with the gate insulating p-Si film with the SiOy film or SiOzNw film from the viewpoint of improving the Vth controllability of TFT and for improving the reliability. When the a-Si film is used for the semiconductor active film, it is desirable to form the vicinity of interface with the gate insulating film under the conditions of small film-forming rate and to form the upper layer portion under the conditions of large film forming rate because TFT characteristics with large mobility can be obtained in a short film-forming time and the leak current at the OFF time of TFT can be reduced.

Examples of ohmic contact film includes $n^+$a-Si film and $n^+$p-Si film in which traces of phosphor is doped in a-Si or p-Si. The film thickness of ohmic contact film can range from 20 nm to 70 nm. These SiNx film, SiOy film, SiOzNw film, a-Si film, p-Si film, $n^+$a-Si film and $n^+$p-Si film can be formed using publicly known gas (for example, $SiH_4$, $NH_3$, $H_2$, $HO_2$, $PH_3$, and $N_2$, and mixture gas comprising at least two of $SiH_4$, $NH_3$, $H_2$, $HO_2$, $PH_3$ and $N_2$.

Then, in the second photolithography process, the semiconductor active film and ohmic contact film are patterned and formed in the shape of the semiconductor active film and ohmic contact film 13 in a pattern greater than the portion where source line 14 and TFT are formed and at the same time in a continuous shape, in the portion where the display pixel TFT is formed (hereinafter referred to as the TFT portion) and the portion where the source line is formed (hereinafter called the source line portion). The semiconductor active film and ohmic contact film are etched by dry etching using the known gas (for example, mixture gas of $SF_6$ and $O_2$ or mixture gas of $CF_4$ and $O_2$). It has been explained that in this process, the semiconductor active film and ohmic contact film 13 are formed in a continuos shape on the portion where the TFT portion and source line of the display pixel are formed. In addition, in this process, the semiconductor active film and ohmic contact film of the second display portion lead-out line from which the source line is pulled out must have the etching removed, and the semiconductor active film and ohmic contact film formed at the source line portion are formed in the shape crossing the source-side lead-out line outside the display portion. It is desirable to elongate the end face length for the portion which cuts across the source-side lead-out line of this semiconductor active film and ohmic contact film from the viewpoint of preventing disconnection of the source line at the portion of pattern stepping of the semiconductor active film and ohmic contact film singularly existing under the source line for the area from the display portion to the portion where the TCP terminal is formed (driver output connection terminal, hereinafter called the "TCP terminal portion"). By the way, it is desirable to etch the edges of the semiconductor active film and the ohmic contact film in the tapered shape from the viewpoint of preventing disconnection of the source line at the pattern stepping of the semiconductor active film and ohmic contact film singularly existing under the source line for the area from the display portion to the TCP terminal portion.

Then, using the sputtering process, the second metal thin film is formed throughout the whole surface of the glass substrate. For the second metal thin film, it is possible to use thin film about 100 nm to 500 nm thick comprising at least one of, for example, chromium molybdenum, tantalum, titanium, aluminum, and copper, or alloys produced by adding traces of other substances to at least one of these metal single substance. Because on the second metal thin film, a contact hole is formed by dry etching in the process later discussed, and in addition, the conductive thin film is formed, it is desirable to use metal thin film difficult to generate surface oxidation or the metal film which has conductivity even if it is oxidized for the first metal thin film, and it is desirable that at least the surface is covered with chromium, titanium, tantalum, or molybdenum. In addition, it is desirable that of the second metal thin film, at least the interface between the ohmic contact film and the second metal thin film is formed with chromium, titanium, tantalum, or molybdenum from the viewpoint of achieving good contact characteristics with ohmic contact film. For the second metal thin film, it is possible to use the metal thin film laminated with dissimilar metal thin films or the metal thin film with varying compositions in the film thickness direction.

Then, in the third photolithography process, the second metal thin film is patterned in the shape of the source electrode 7, source line 14, drain electrode 15 of the TFT as well as the lead-out line 24 of the second display portion, and in addition, of the ohmic contact films, etching protruding from the source line, source electrode, and drain electrode is removed to form the TFT channel of the pixel portion. Etching of the second metal film is carried out by wet etching using the publicly known etchant (for example, if the second metal thin film comprises chromium, aqueous solution mixed with the ceric nitrate anmon and nitric acid). It is desirable to etch the second metal film in such a manner to have a pattern edge in the tapered profile in view of prevention of disconnection of the electrode pattern comprising the conductive thin film which forms the top layer. The ohmic contact film are etched by dry etching using the publicly known gas (for example, mixture gas of $SF_6$ and $O_2$ or mixture gas of $CF_4$ and $O_2$). In the etching of the ohmic contact film, etching is controlled to the depth where at least ohmic contact film is removed, and to the depth where the semiconductor active film of the lower layer is not lost. It is desirable to leave the semiconductor active film of the bottom surface as thick as possible from the viewpoint of obtaining TFT with bigger mobility.

Then, by the plasma CVD process, etc., the second insulating film which serves as a passivation film is formed. Examples of the second insulating film include $SiN_x$ film, $SiO_y$ film, and $SiO_zN_w$ film. The second insulating film should be about 200 nm or more, and in the case of excessively thick film, nonconformity would occur in that the photosensitive resist is lost at the time of dry etching of the contact hole later discussed, and therefore, the film thickness should be selected by the resist at the time of dry-etching of contact holes and the selectivity with the second insulating film. In the case of excessive thickness, the electrodes by the conductive thin film formed on the contact holes generate level-difference cuts, and consequently, the upper limit of the film thickness is determined by the step coverage of the conductive tin film. The step coverage means the quality of the film covering condition at the fine level difference portions on the surface. It is desirable to achieve the film thickness from about 200 nm to 600 nm from the viewpoint of the productivity, step coverage of the conductive thin film, selectivity of combination of resist with dry etching for forming contact holes on the second insulating film, etc.

Next, in the fourth photolithography process, the second insulating film and the first insulating film are patterned to form contact holes. The contact holes to be formed are pixel contact hole 16 which are contact holes penetrating to the drain electrode surface, the first TCP terminal contact 22 which is the first contact hole penetrating to the first metal thin film surface, and the second TCP portion terminal contact 26 which is the second contact hole penetrating to the second metal thin film surface. Etching of the second insulating film and the first insulating film are carried out by dry etching using the known gas (for example, mixture gas of $SF_6$ and $O_2$ or mixture gas of $CF_4$ and $O_2$). It was described that in this process the pixel contact hole 16, k the first TCP terminal contact 22, and the second TCP terminal contact 26 are formed, but in addition to these, for example, contact holes of the portion for forming transfer terminals (hereinafter called "transfer terminal portion") for electrically connecting the space between the opposite substrate and the TFT array substrate, or other various contact holes necessary for manufacturing TFT array substrates are formed.

In etching this contact hole, because etching of the second insulating film is removed in the case of pixel contact hole 16 and the second TCP terminal contact 26, and that of the second insulating film and the first insulating film in the case of the first TCP terminal contact 22, particularly the second metal thin film surface of the pixel contact hole 16 and the second TCP terminal contact 26 is exposed to the plasma of dry etching for a long time. When the metal thin film surface is exposed to the plasmas of dry etching for a long time, if there exist any plasma species that etch or oxidize the metal thin film, the electric resistance with the conductive thin film of the top portion at the contact hole increases, and it is necessary to select the kind of materials for the second metal thin film and the gas species in dry etching. When the second metal thin film surface is composed of chromium, $CF_4$ gas and $O_2$ gas or $SF_6$ gas and $O_2$ gas can be used. When the metal thin film surface is exposed to the plasma state during dry etching for a long time, there is a case in that deposits produced by polymerization reactions of gas species (hereinafter referred to as "deposits") may adhere. In this event, satisfactory contact characteristics with the top portion conductive thin film at the contact hole by removing the deposits by ashing by plasmas using $O_2$ gas. The conditions of gas species in etching described as above can be applied similarly to the first TCP terminal contact 22, though there is a difference in some degree. In addition, because the pattern edge is made in a taper shape in etching these contact holes, it is desirable to prevent disconnection at the level difference of contact holes of electrode patterns comprising conductive thin films formed on the top layer.

Now, using the sputtering process or other processes, the conductive thin films that serve as pixel electrodes and TCP connecting electrodes are formed. For conductive thin films, transparent conductive film ITO (indium tin oxide), $SnO_2$ can be used when the electrodes are formed by the transmission type electro-optic elements, but ITO is particularly desirable from the viewpoint of chemical stability. When the electrodes are composed by reflection type electro-optic elements, any kind of conductive thin films can be used if the sheet resistance is about 500 $\Omega/\square$ or lower and at the same time if the films do not react with the liquid crystal materials and do not cause deterioration of the liquid crystal materials. The film thickness of the conductive thin film should be about 50 nm to 200 nm for the transmission type electro-optic elements and about 50 nm to 500 nm in the case of the reflection type electro-optic elements. The thickness of the transparent conductive thin film for the transmission type electro-optic element should include the thickness of the opposite substrate and be selected from the range from about 50 nm to 200 nm with care to prevent coloring caused by interference when light transmits.

Next, in the fifth photolithography process, the conductive thin film is patterned in the shapes of the first TCP connecting electrode 21 and the second TCP connecting electrode. The conductive thin films shall be etched by the known wet-etching (for example, in the case the conductive thin film comprises ITO, aqueous solution mixed with hydrochloric acid and nitric acid) according to the materials used. When the conductive thin film is ITO, it is possible to etch by dry etching using the known gas (for example, $CH_4$). In addition, it has been discussed that in this process, the pixel contact hole 16, the first TCP terminal contact 2, and the second TCP terminal contact 26 are formed. In addition to these, for example, electrodes comprising conductive thin films are formed at the transfer terminal portion (portion electrically connecting the space between the opposite substrate and TFT array substrate using the resin containing conductive particles).

With the above-mentioned processes, the TFT array substrate shown in FIG. 1, FIG. 2, FIG. 3, and FIG. 4 is manufactured in five processes containing photolithography process, respectively.

Now, the TFT array substrate is inspected of the TFT properties of the display pixel by electrically probing the TCP terminal portion (the probe is connected to obtain signals), and TFT array substrates which cannot provide the specified properties are discarded. By doing so, it is possible to increase the efficiency of the subsequent processes and to save materials to be used. In this event, because the first TCP connecting electrode 21 and the second TCP connecting electrode 25 are present in this embodiment, when ITO is used for the conductive thin film, probing with high reliability is enabled with the conventional technique.

Then, a liquid crystal panel is formed with the liquid crystal sealed between the TFT array substrate and the opposite substrate by combining the TFT array substrate with the opposite substrate by the known technique. Brief description will be made hereunder on the process for manufacturing the liquid crystal panel.

First of all, using the known techniques, the alignment control film of the liquid crystal is formed on the surfaces of TFT array substrate and opposite substrate. For the alignment control film, for example, the polyimide film can be used. For example, after the polyimide liquid is applied and dried to form the polyimide film, the surface undergoes rubbing treatment by the use of cloths, and is used for the alignment controlling film. The thickness of the alignment controlling film should be the super thin film equivalent to one particle composing the alignment controlling film to about 100 nm. When the thickness of the alignment controlling film is large, since the effective voltage applied to the liquid crystal layer is small of the effective voltages applied across the pixel electrode of the TFT array substrate and the common electrode of the opposite substrate, it is desirable to reduce the film to the level that is allowed for the process. The alignment controlling film is formed in such a manner not only to align the director of the liquid crystal to the direction in the substrate plane by rubbing, etc. but also to align with a gradient from about 3° to 15° with respect to the substrate as a so-called pretilt angle (angle made by the liquid crystal particle and the substrate). When the pretilt angle is excessively small, the pretilt angle may sometimes generate a so-called domain (zone under alignment state) followed by disclination, which means the boundary portion with discontinuous liquid crystal alignment, that is, discontinuous director, or discontinuous structure caused by the electric field generated around the pixel electrode and across the source line, gate line, and auxiliary capacity line on the TFT array substrate. Because lowering of display properties, such as lowering of the contrast, occurs when this domain is generated at the light transmitting portion, alignment of the liquid crystal is controlled to proper angles in accordance with the likeliness to generate the domain for each type of the liquid crystal material used. This pretilt angle can be controlled in accordance with the alignment controlling film material used and conditions such as intensity of alignment treatment including rubbing, etc. When the pretilt angle is excessively large, it is likely to be difficult to stably control alignment, and it is desirable to control the pretilt angle to the above-mentioned range, that is, about 3° to 15°.

It is desirable to use the material difficult to cause poring or absorption of impurities in the liquid crystal by the DC potential generated between TFT array substrate and common electrodes of the opposite substrate due to the difference of dVgd by the display signal for the alignment controlling film because image tricking of the display is unlikely to occur. These are known to be obtained as known techniques to make the alignment controlling film thinner, reducing the resistance in the plane direction of the alignment controlling film. Application of the alignment controlling film material to the substrate can be achieved by transferring spinner (application using spin (spin coating)).

Next, on, at least, either one of the TFT array substrate or the opposite substrate, a material which can serve as a spacer is sprinkled in order to affix the TFT array substrate to the opposite substrate with a specified clearance held. Because the TFT or line on the TFT array substrate is damaged, if the spacer hardness is high or profile is acute when the TFT array substrate is affixed to the opposite substrate with a specified clearance provided, the spacer material must be selected with these taken into account. For the spacer, for example, polystyrene grains, $SiO_2$ grains can be used. With respect to the spacer sprinkling density, because excessively high sprinkling density disturbs the liquid crystal alignment condition around the spacer, lowering of contrast occurs, or when temperature is low and the liquid crystal volume is reduced, air bubbles may be generated on the display portion. When the spacer sprinkling density is excessively small, the clearance between the TFT array substrate and the opposite substrate generate the distribution in the plane at the display portion and nonuniform brightness is generated. By these restrictions, the spacer sprinkling density is selected in accordance with the hardness of the spacer used. Spacer can be sprinkled by sprinkling the solution with the spacer dispersed in the volatile solvent (for example, ethanol) and applying.

Next, on either one of the TFT array substrate or the opposite substrate, sealing material comprising, for example, epoxy resin is formed in the form of seal around the display portion. By uniformly sprinkling and soaking the above-mentioned spacer over the sealing material, it is possible to accurately control the clearance between the TFT array substrate and the opposite substrate. For the spacer contained in the sealing material, the material and particle size different from those of the sealing material to be sprinkled in the substrate plane can be used. In order to inject the liquid crystal to the clearance between the TFT array substrate and the opposite substrate by the vacuum injection method later described, a sealing material is formed on either of the substrates, but a notch that serves a filler of the liquid crystal must be provided in at least one place in the profile pattern indicating the region to be formed. When the liquid crystal is introduced by the known technique and a method other than the vacuum injection method, seal-form notch is not required. For the formation of the seal profile, screen printing, drawing by syringe (a method for discharging the sealing material by the syringe and for scratching drawing to the seal profile), etc. can be used.

Next, on at least either one of the TFT array substrate or opposite substrate, the transfer material with conductivity is applied to the position of the transfer electrode formed on the TFT array substrate. This transfer electrode is an electrode terminal for introducing the common electrode potential to the common electrode of the opposite substrate. For the transfer material, the material with the conductive particles dispersed in, for example, epoxy resin can be used. For applying the transfer material, screen printing, drawing by syringe can be used. Though the transfer electrode is required, at least, at one place, because reducing the impedance from the signal source of the common electrode potential to the common electrode of the opposite substrate is preferable to obtain uniform display, in a large-size electro-optic element, it is desirable to form transfer electrodes at four corners of the display portion or to form a plurality of transfer electrodes around the display portion, while avoiding the gate-side lead-out line and source-side lead-out line.

Next, the TFT array substrate and the opposite substrate are affixed each other. When affixing, before pressurizing and heating to cure the sealing material or transfer material, the TFT array substrate and the opposite substrate are superimposed at a specified accuracy. Next, to the end face of both superimposed substrates, UV curable resin is applied or to the portion other than the display portion, the resin is applied by syringe, etc. Thereafter, it is preferable to superimpose the TFT array substrate and the opposite substrate at a specified accuracy, then, subject the UV curable material to UV-irradiation in order to keep the superimposing of the TFT array substrate and the opposite substrate at a specified accuracy. After treating in this way, with the space between the TFT array substrate and the opposite substrate pressurized, the sealing material and transfer material are cured by heating.

Next, of the superimposed TFT array substrates and opposite substrates, unnecessary portion for the electro-optic element is cut away to bring the TCP connecting terminal portion to the surface, or to form a liquid crystal filler to make empty cells.

Next, the empty cell is introduced to the vacuum, and after evacuating the empty cell, the empty cell is open to atmosphere with the filler immersed in the liquid crystal, and the liquid crystal is injected into the empty cell. In this process, in the case the speed to evacuate the atmosphere where the empty cell is placed is excessively fast, the cell expands by the air remaining in the empty cell, possibly causing seal puncture, and it is preferable to evacuate at a suitable speed. In the case the filler is immersed with liquid crystal and the atmosphere in which the empty cell is placed, atmospheric pressure is applied to the empty cell, deforming the spacer or damaging the substrate surface by the spacer, and it is desirable to open to atmosphere at a suitable speed.

Next, the sealing material comprising epoxy resin, UV curable resin is applied to the filler and cured to form the liquid crystal display. In this event, before applying the sealing material, the cell with the liquid crystal injected may be pressurized so that the clearance between the TFT array substrate and the opposite substrate can be uniform.

Next, on the top and the bottom of the sealed cell, polarizers are affixed with the polarization axis set to a specified angle. This specified angle is an angle at which the polarization axes of top and bottom polarizers are brought to intersect each other at right angles and each of the polarization axis is in parallel or intersecting at right angles to the direction of the director of the liquid crystal on the neighboring substrate when the display is carried out in the normally white mode in which the transmissivity becomes small when the large effective voltage is applied to the liquid crystal layer using, for example, TN liquid crystal. In particular, because the change in display characteristics by the angle of visibility can be reduced, the angle that allows the polarization axis to intersect at right angles to the director on the neighboring substrate is preferable.

In addition, it is possible to laminate the known film which can improve the dependency of angle of visibility of the electro-optic element on the polarizers, or to use the polarizers laminated with these films. When the TN type liquid crystal is used for the liquid crystal, alignment treatment is carried out so that the liquid crystal directors intersect at right angles at the top and the bottom substrates, but the polarization axis of the polarizer plate should be in the direction in parallel or intersecting at right angles to the direction of the director of the neighboring substrate surface. In order to obtain the display with high contrast, it is preferable to achieve the configuration in that the top and the bottom polarization axes intersect at right angles so that the light does not transmit with the voltage applied to the liquid crystal.

Now, the liquid crystal display panel electrically probes and displays at the TCP terminal portion, and inspects the display characteristics, and the liquid crystal panel which does not provide a specified property is discarded. By doing so, the process thereafter can improve the efficiency and the material used can be saved.

Carrying out the process for manufacturing the liquid crystal display panel with a plurality of display elements formed on the same substrate within the physically enabled range achieves the efficient manufacture of liquid crystal display panels. It is also possible to carry out the inspection for the display characteristics of the liquid crystal display panels before affixing the polalizer. In this case, at the time of inspection, it is possible to carry out inspection by separately placing the polarizers on the top and the bottom of the sealed cell during inspection, and if the specified properties are not obtained, the liquid crystal display panels are not allowed to flow to the subsequent processes, thereby enabling the saving of polarizers to be used. In addition, it is possible to replace the order of the processes within the physically enabling range.

Then, to the TCP output terminal connection portion of the liquid crystal panel, TCP is bonded using the anisotropic conductive film (ACF). The construction of the TCP driver output terminal is either (1) construction in which the first metal thin film is laminated with the first insulating film and the second insulating film, and conductive thin film, and the first metal thin film and the conductive thin film are formed in the first and the second insulating film by the fourth photolithography process and at the same time, are electrically connected by the contact holes penetrating to the first metal thin film or (2) the first insulating film, the second metal thin film, the second insulating film, and conductive thin film are laminated, and the second metal thin film and the conductive thin film are formed in the second insulating film by the fourth photolithography process, and are electrically connected with the contact holes penetrating to the second metal thin film surface, and at the same time, the contact hole of the driver output connection terminal portion of TCP is covered with ACF. ACF connects the TCP to the driver output connecting terminal of TCP. For ACF, those with conductive particles dispersed in the thermosetting type or thermoplastic type resins are used. In this event, as shown in FIG. 3 and FIG. 4, ACF is placed at the position completely covering the first TCP terminal contact 22 and the second TCP terminal contact 26, that is, the first TCP connecting range 23 and the second TCP connecting range 27. By doing so, the contact hole level difference portion of the TCP terminal portion is covered with ACF, and even when crack, etc. are generated in the conductive thin film at the level difference portion, the display portion lead-out electrode is no longer exposed to humidity in the atmosphere, and the corrosion by humidity can be prevented.

The first TCP connecting electrode 21 and the second TCP connecting electrode 25 of the TCP terminal portion are not indispensable for the electro-optic apparatus. In the case no inspection is required or the first metal thin film surface and the second metal thin film surface are inspected using the probing technique with high electric reliability, it is possible to omit the first TCP connecting electrode and the second TCP connecting electrode. In this case, the first TCP terminal contact 22 and the second TCP terminal contact are able to reduce contact resistance with TCP and are not exposed to the atmosphere by increasing ACF to the maximum within the range to be placed, which is preferable.

Next, by the known technique, TCP is connected to the drive circuit substrate by, for example, ACF or soldering, and in addition, other necessary control circuit substrates, connectors with external signals, backlight system, and box are mounted to manufacture the electro-optic element.

In this embodiment, the semiconductor active film and ohmic contact film 13 are formed in a continuous profile greater than the patterns than those of source electrode and the source line 14 on the bottom layer of the source electrode 7 and the source line 14 from the TFT portion. Consequently, the source line does not exceed the level difference around the patterns of semiconductor active film and ohmic contact film in the display region of the source electrode, and it is possible to form the TFT array substrate free of disconnection of source line at this level difference in five processes containing the photolithography process, respectively. Even when the semiconductor active film and ohmic contact film remain between the pixel electrode and the source line by the foreign matters in the process, the pixel electrode is separated from the semiconductor active film and ohmic contact film by the second insulating film, and the pixel electrode does not come in electrical contact with the semiconductor active film and ohmic contact film, not resulting in generation of defects.

It is possible to manufacture the electro-optic element with high humidity resistance of the TCP terminal portion by completely covering the contact hole of the TCP terminal portion with ACF. In addition, in this embodiment, because the conductive thin film is formed on the outermost surface of the TFT array substrate, the signal voltage amplitudes required for applying to the liquid crystal can be reduced. In this way, in this embodiment, the electro-optic element with less defects and with high reliability can be manufactured by the TFT array process with less number of processes. In this embodiment, because the source electrode of the TFT portion is pulled out from other than the intersections between the source line and the gate line. Consequently, in the case any defect occurs in TFT of the display pixel, the midway, that is, the portion before reaching the gate line of the source electrode pulled out from the source line is cut by laser irradiation to eliminate influences of the defect of the TFT portion of the display pixel on other display pixels. In this embodiment, because auxiliary capacity electrodes are arranged around the pixel electrodes, it is possible to reduce the light-shielding portion around the display electrode formed on the opposite substrate, and an electro-optic element with a large aperture ratio can be fabricated. In forming of each electric pattern, it is preferable to make the corner portion of the electrode pattern be an obtuse angle equal to or exceeding 90° from the viewpoint of preventing destruction by static electricity in the process.

Embodiment 2

Figure 5:
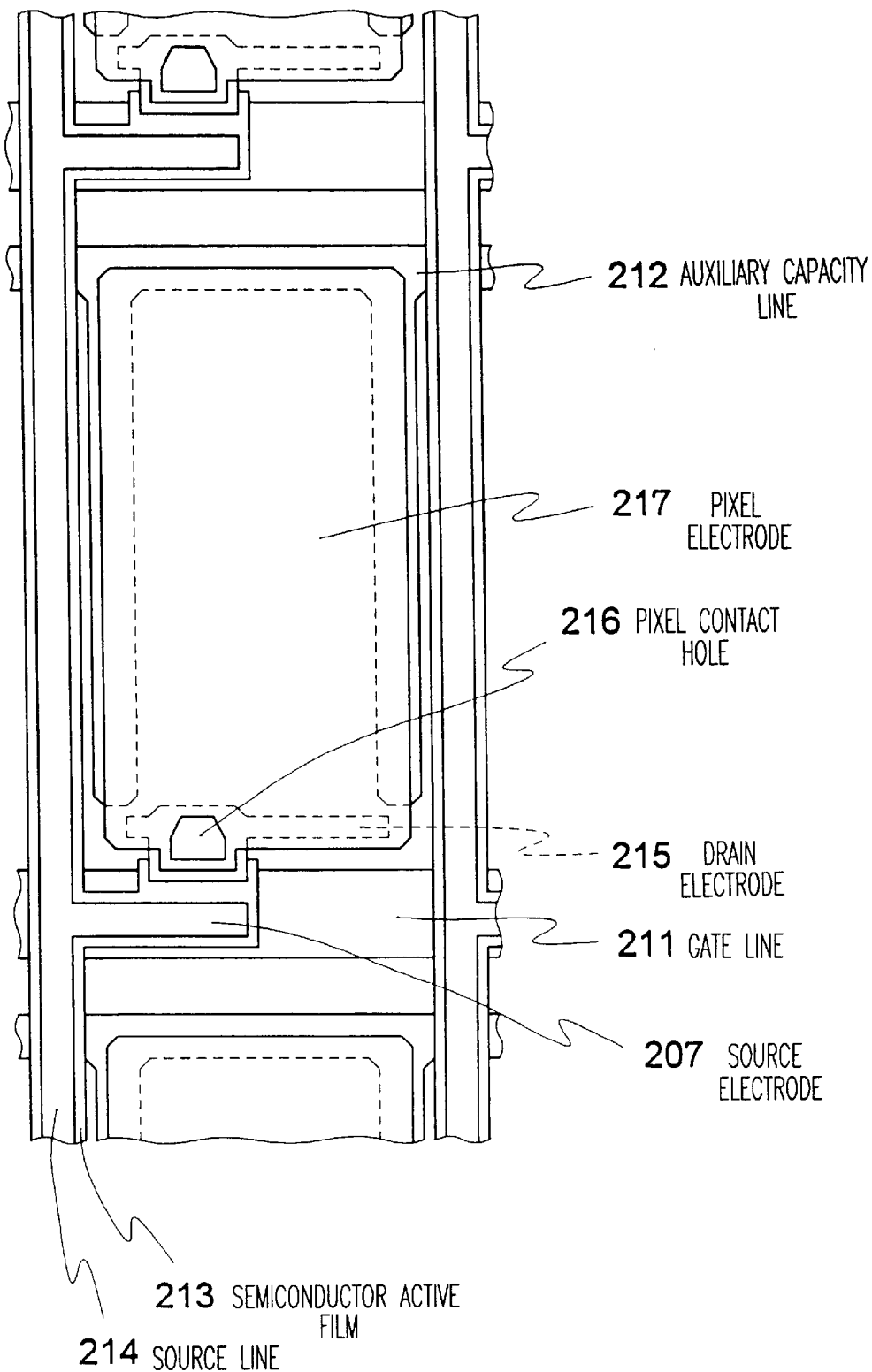
FIG. 5 is a plan view illustrating the display pixel related to Embodiment 2 of the present invention.

FIG. 5 is a plan view of the display pixel fabricated by the method for manufacturing the electro-optic element related to Embodiment 2 according to the present invention. In FIG. 5, numeral 207 designates the source electrode, 211 the gate line, 212 the auxiliary capacity line, 213 the semiconductor active film and ohmic contact film, 214 the source line, 215 the drain electrode, 216 the pixel contact hole, and 217 the pixel electrode. The construction of the main cross section of the display pixel is the same as that of FIG. 1. In addition, the construction of the cross-section of the TCP terminal portion provided outside the display region for connecting the gate line, source line, auxiliary capacity line, and signal potential source to be inputted to the common electrode on the opposite electrode to the gate line, the source line, the auxiliary capacity line, and the common electrode is the same as that shown in FIG. 3 and FIG. 4.

In the display pixel according to this embodiment, all the points except the portion in that lead-out of the source line is changed so that the source electrode of the TFT portion can be pulled out on the gate line from the intersecting portion between the source line and the gate line and the method for manufacturing display pixels are same as Embodiment 1. In this embodiment, as described above, because the source electrode of the TFT portion is pulled out on the gate line from the intersecting portion between the source line and the gate line, the frequency exceeding the gate line terminal can be reduced one time for each pixel from the case of Embodiment 1. Consequently in this embodiment, it is possible to eliminate short-circuiting between the gate line and the source electrode due to level difference of the gate line edge. In addition, in this embodiment, the area required for line the source electrode of the TFT portion can be minimized, and the electro-optic element with a large aperture ratio can be manufactured.

Embodiment 3

Figure 6:
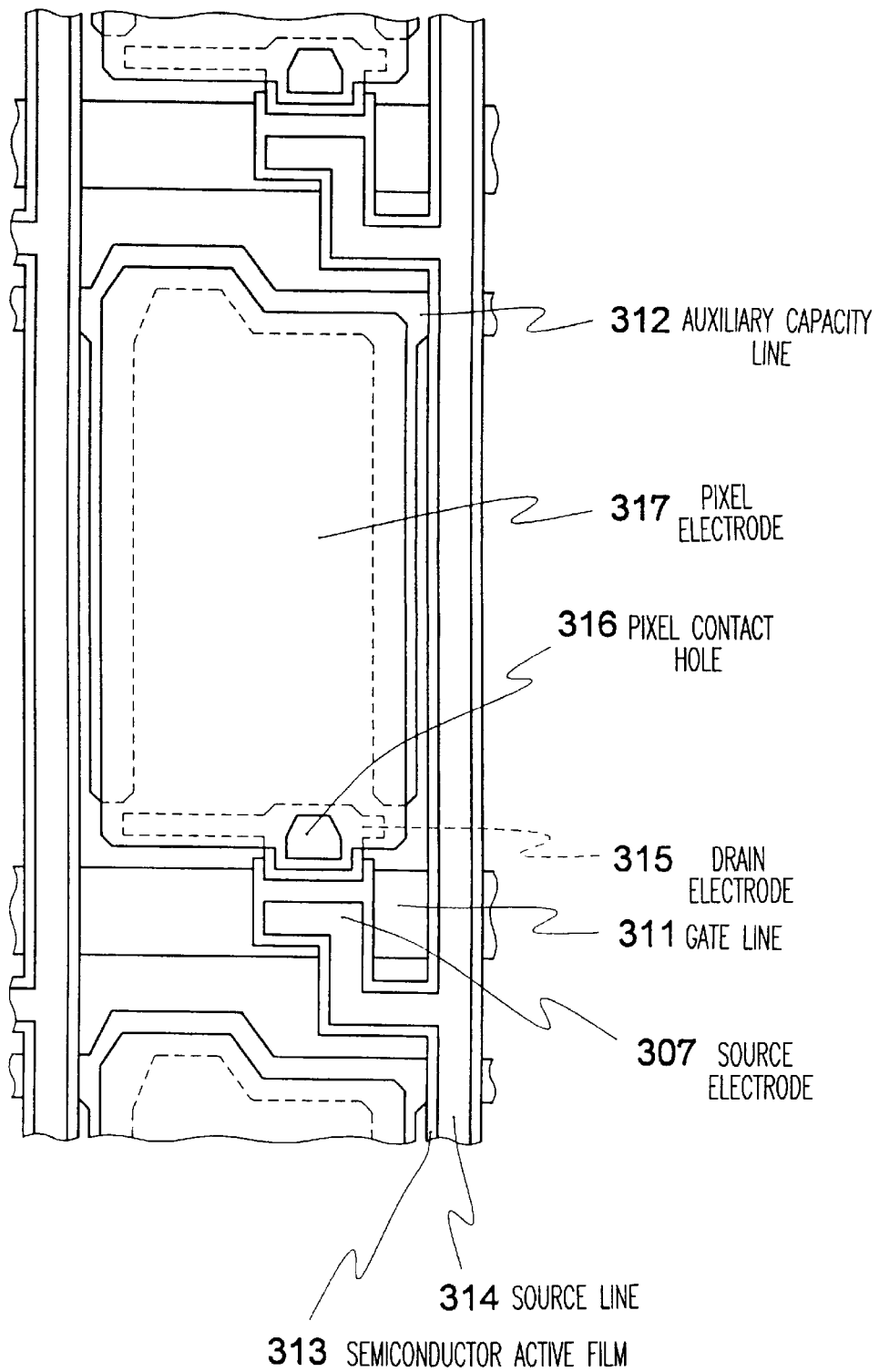
FIG. 6 is a plane view illustrating the display pixel related to Embodiment 3 of the present invention.

FIG. 6 is a plan view of the display pixel fabricated by the method for manufacturing the electro-optic element related to Embodiment 3 according to the present invention. In FIG. 6, numeral 307 designates the source electrode, 311 the gate line, 312 the auxiliary capacity line, 313 the semiconductor active film and ohmic contact film, 314 the source line, 315 the drain electrode, 316 the pixel contact hole, and 317 the pixel electrode. The construction of the main cross section of the display pixel is the same as that of FIG. 1. In addition, the construction of the cross-section of the TCP terminal portion provided outside the display region for connecting the gate line, source line, auxiliary capacity line, and signal potential source to be inputted to the common electrode on the opposite electrode to the gate line, the source line, the auxiliary capacity line, and the common electrode is the same as that shown in FIG. 3 and FIG. 4.

In the display pixel according to this embodiment, all the points except the portion in that the relative positional relationship of the source line and TFT to the display electrode and the method for manufacturing display pixels are same as Embodiment 1 but in this embodiment, the relative positional relationship of the source line and TFT to the display electrode is changed. By doing so, because it is possible to vary the direction of the electric field generated by the potential difference between the pixel electrode potential and source line potential, gate line potential, and auxiliary capacity line potential, the condition for generating domain which is generated around the pixel electrode can be varied. For example, the electric field from the source electrode to the pixel electrode is at the upper right of the pixel and in the lower right direction in Embodiment 1, whereas it is at the upper right and in the lower left direction. Consequently, because the light-shielding portion arranged on the opposite substrate can be reduced from the case of Embodiment 1 by the liquid crystal material used or alignment controlling film, drive voltage, or drive waveform, it is possible to manufacture the electro-optic element with a high aperture ratio.

Embodiment 4

Figure 7:
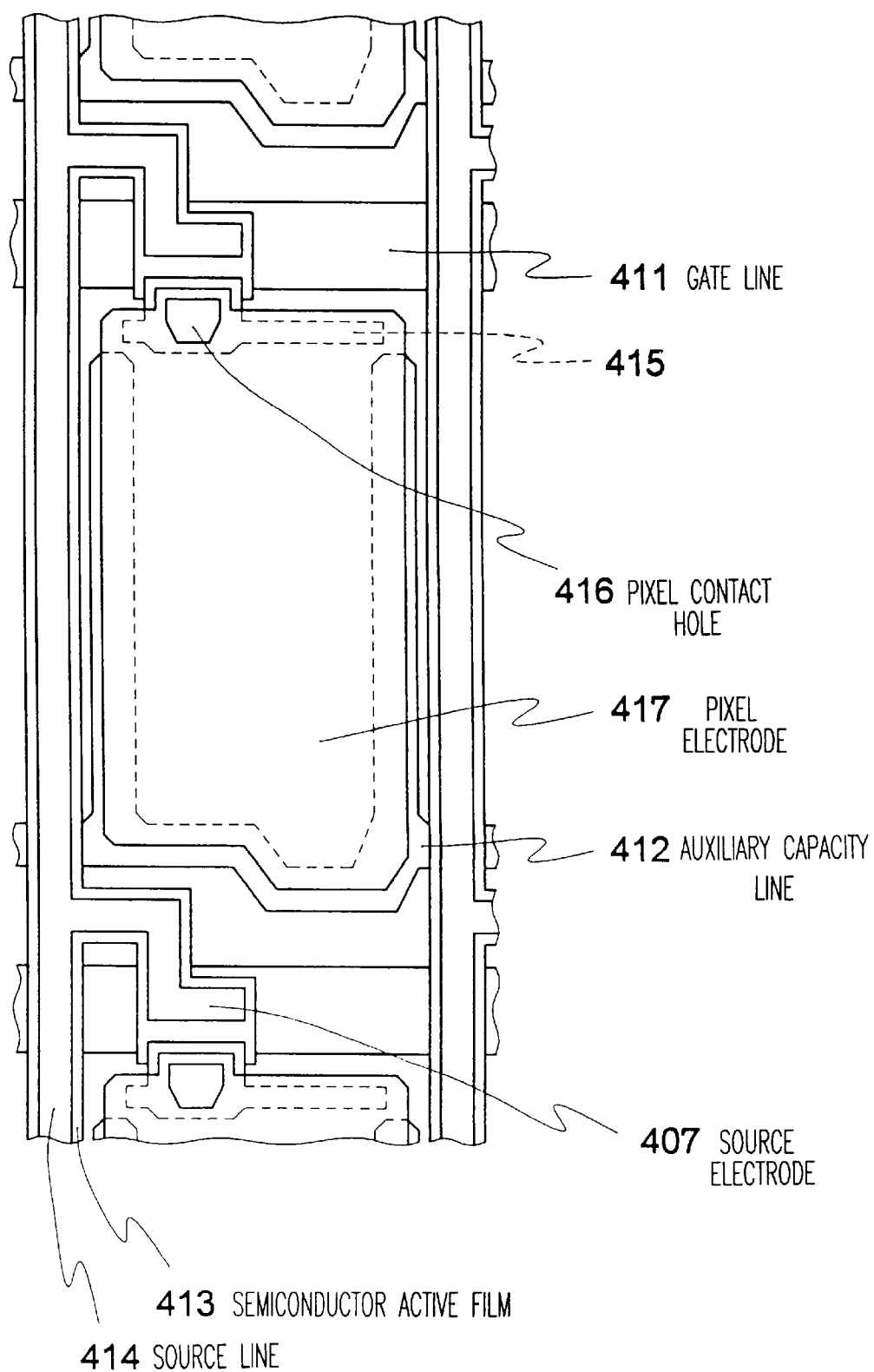
FIG. 7 is a plane view illustrating the display pixel related to Embodiment 4 of the present invention.

FIG. 7 is a plan view of the display pixel fabricated by the method for manufacturing the electro-optic element related to Embodiment 4 according to the present invention. In FIG. 7, numeral 407 designates the source electrode, 411 the gate line, 412 the auxiliary capacity line, 413 the semiconductor active film and ohmic contact film, 414 the source line, 415 the drain electrode, 416 the pixel contact hole, and 417 the pixel electrode. The construction of the main cross section of the display pixel is the same as that of FIG. 1. In addition, the construction of the cross-section of the TCP terminal portion provided outside the display region for connecting the gate line, source line, auxiliary capacity line, and signal potential source to be inputted to the common electrode on the opposite electrode to the gate line, the source line, the auxiliary capacity line, and the common electrode is the same as that shown in FIG. 3 and FIG. 4.

In the display pixel according to this embodiment, all the points except the portion in that the relative positional relationship of the source line and TFT to the display electrode and the method for manufacturing display pixels are same as Embodiment 1 but in this embodiment, the relative positional relationship of the source line and TFT to the display electrode is changed. By doing so, because it is possible to vary the direction of the electric field generated by the potential difference between the pixel electrode potential and source line potential, gate line potential, and auxiliary capacity line potential, the condition for generating domain which is generated around the pixel electrode can be varied. For example, the electric field from the source electrode to the pixel electrode is at the upper right of the pixel and in the lower right direction in Embodiment 1, whereas it is at the lower left and in the upper right direction. Consequently, because the light-shielding portion arranged on the opposite substrate can be reduced from the case of Embodiment 1 by the liquid crystal material used or alignment controlling film, drive voltage, or drive waveform, it is possible to manufacture the electro-optic element with a high aperture ratio.

Embodiment 5

Figure 8:
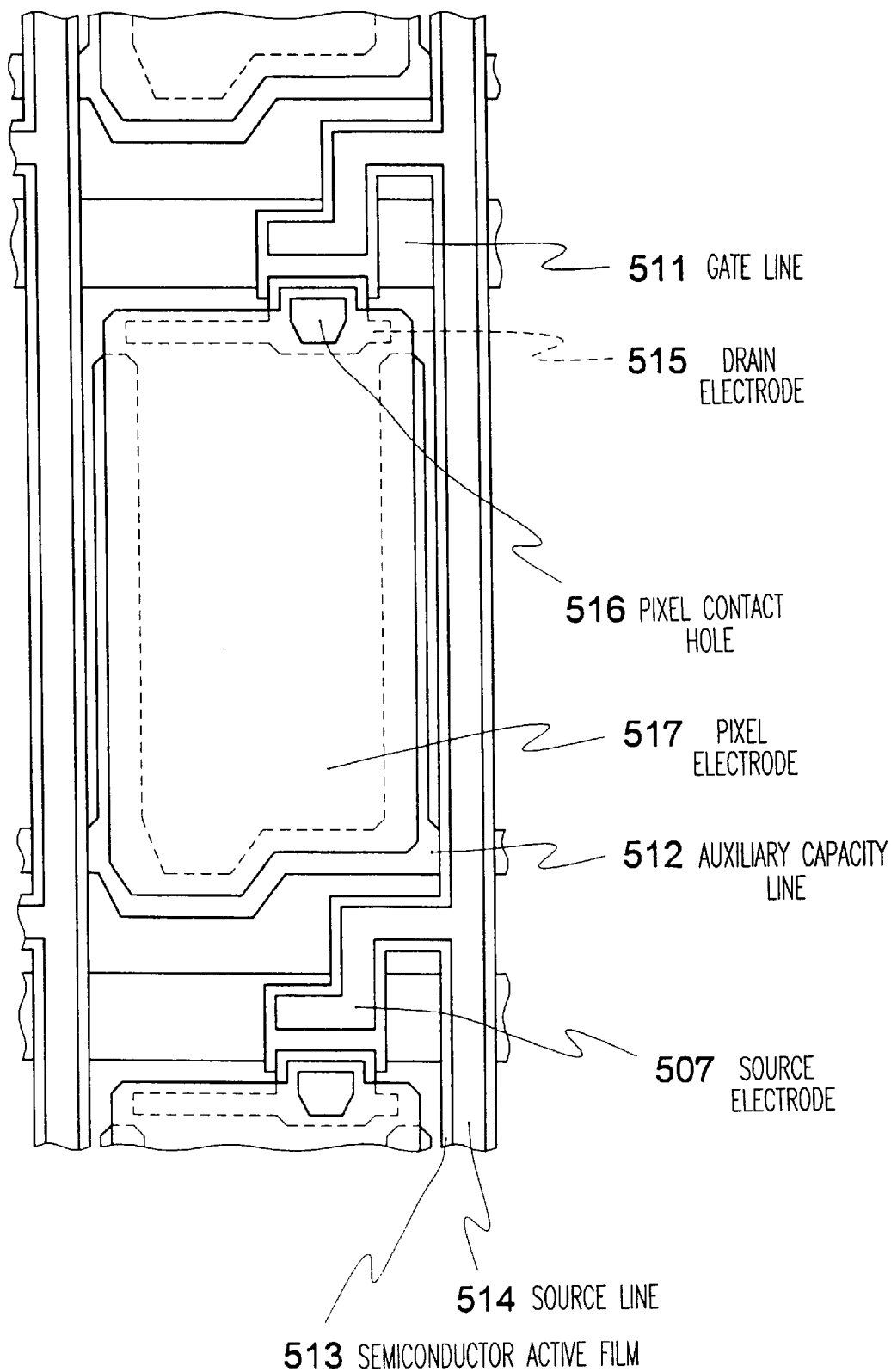
FIG. 8 is a plane view illustrating the display pixel related to Embodiment 5 of the present invention.

FIG. 8 is a plan view of the display pixel fabricated by the method for manufacturing the electro-optic element related to Embodiment 5 according to the present invention. In FIG. 8, numeral 507 designates the source electrode, 511 the gate line, 512 the auxiliary capacity line, 513 the semiconductor active film and ohmic contact film, 514 the source line, 515 the drain electrode, 516 the pixel contact hole, and 517 the pixel electrode. The construction of the main cross section of the display pixel is the same as that of FIG. 1. In addition, the construction of the cross-section of the TCP terminal portion provided outside the display region for connecting the gate line, source line, auxiliary capacity line, and signal potential source to be inputted to the common electrode on the opposite electrode to the gate line, the source line, the auxiliary capacity line, and the common electrode is the same as that shown in FIG. 3 and FIG. 4.

In the display pixel according to this embodiment, all the points except the portion in that the relative positional relationship of the source line and TFT to the display electrode and the method for manufacturing display pixels are same as Embodiment 1 but in this embodiment, the relative positional relationship of the source line and TFT to the display electrode is changed. By doing so, because it is possible to vary the direction of the electric field generated by the potential difference between the pixel electrode potential and source line potential, gate line potential, and auxiliary capacity line potential, the condition for generating domain which is generated around the pixel electrode can be varied. For example, the electric field from the source electrode to the pixel electrode is at the upper right of the pixel and in the lower right direction in Embodiment 1, whereas it is at the lower right and in the upper left direction. Consequently, because the light-shielding portion arranged on the opposite substrate can be reduced from the case of Embodiment 1 by the liquid crystal material used or alignment controlling film, drive voltage, or drive waveform, it is possible to manufacture the electro-optic element with a high aperture ratio.

Embodiment 6

Figure 9:
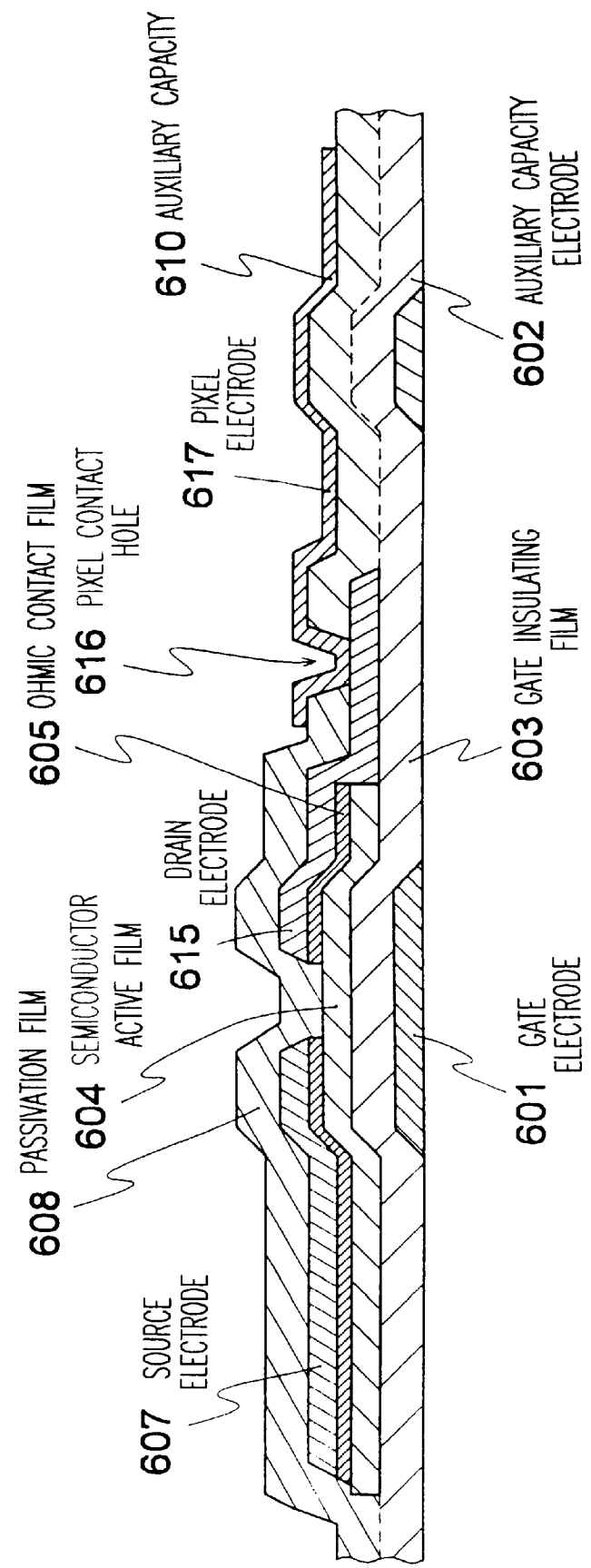
FIG. 9 is a cross-sectional view illustrating the main portion of the display pixel related to Embodiment 6 of the present invention.
Figure 10:
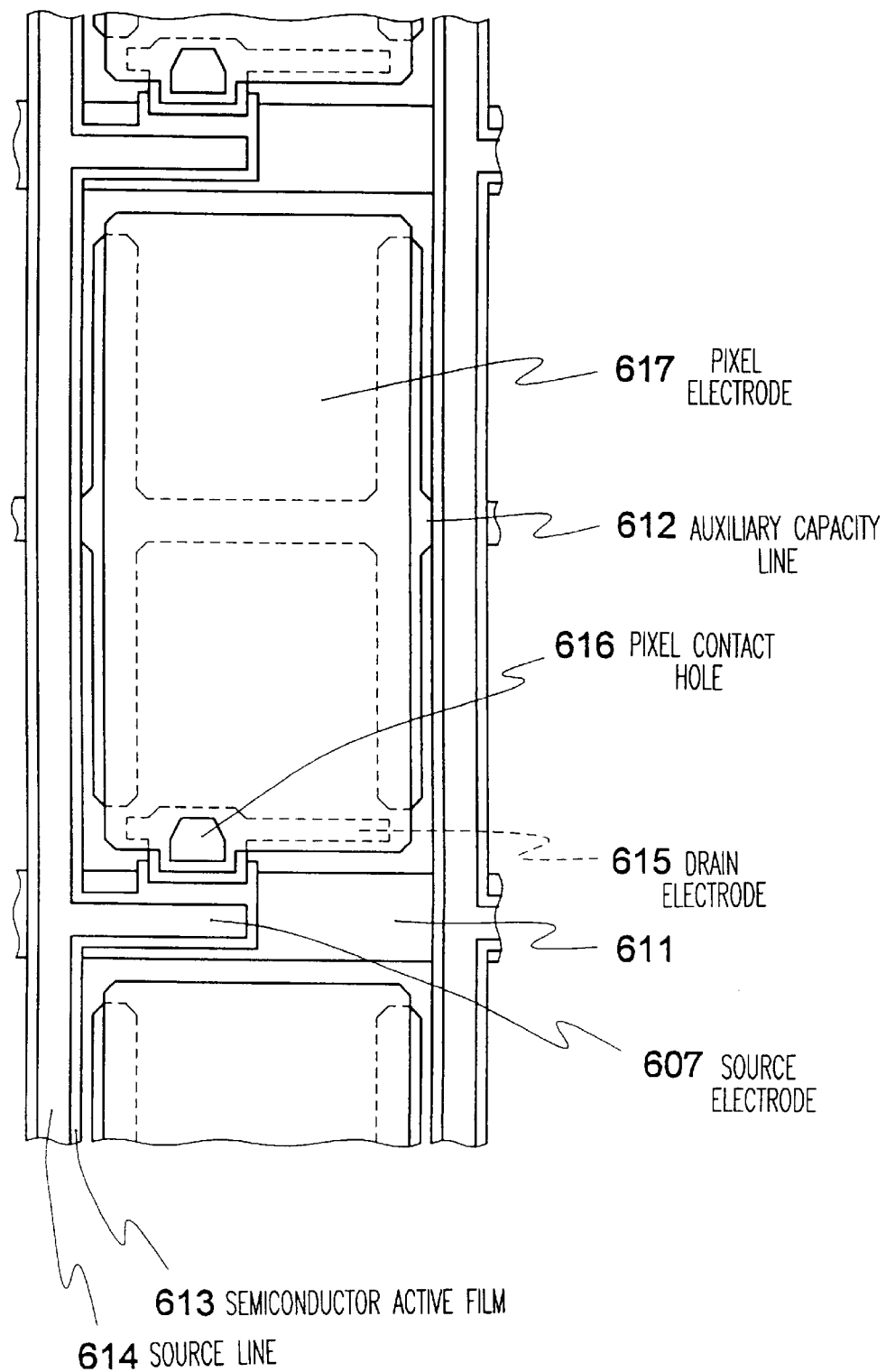
FIG. 10 is a plane view illustrating the display pixel related to Embodiment 6 of the present invention.

FIG. 9 and FIG. 10 are a cross-sectional view and a plan view of the display pixel fabricated by the method for manufacturing the electro-optic element related to Embodiment 6 according to the present invention. In FIG. 9 and FIG. 10, numeral 601 designates the gate electrode, 602 the auxiliary capacity electrode, 603 the gate insulating film, 604 the semiconductor active film, 605 the ohmic contact film, 607 the source electrode, 608 the passivation film, 610 the auxiliary capacity, 612 the auxiliary capacity line, 613 the semiconductor active film and ohmic contact film, 614 the source line, 615 the drain electrode, 616 the pixel contact hole, and 617 the pixel electrode. The cross-section of the TCP terminal portion provided outside the display region for connecting the gate line, source line, auxiliary capacity line, and signal potential source to be inputted to the common electrode on the opposite electrode to the gate line, the source line, the auxiliary capacity line, and the common electrode is the same as that shown in FIG. 3 and FIG. 4. The features of the construction of the display pixel related to this embodiment lies in the change of the position of the auxiliary capacity line. That is, the position of the auxiliary capacity line is changed to the intermediate position between the gate line and the gate line on the preceding stage (or the gate line on the succeeding stage), and the auxiliary capacity electrode is changed to be branched to both sides of the auxiliary capacity line. Except the changes made in the position of the auxiliary capacity electrode and auxiliary capacity line, all other points are same as Embodiment 2. Though the method for manufacturing the display pixels related to this embodiment is same as that of Embodiment 1, in this embodiment, because the source electrode of the TFT portion is pulled out on the gate line from the intersecting portion between the source line and the gate line, the frequency exceeding the gate line terminal can be reduced one time for each pixel from the case of Embodiment 1. Consequently in this embodiment, it is possible to eliminate short-circuiting between the gate line and the source electrode due to level difference of the gate line edge. In addition, in this embodiment, because it is possible to widen the inter-line distance between the gate line and auxiliary capacity line (portion parallel to the gate line) which are different line installation in the same layer which only exists in using the auxiliary capacity line of the present invention, short-circuiting between the gate line and the auxiliary capacity line by defective patterning can be reduced.

Embodiment 7

Figure 11:
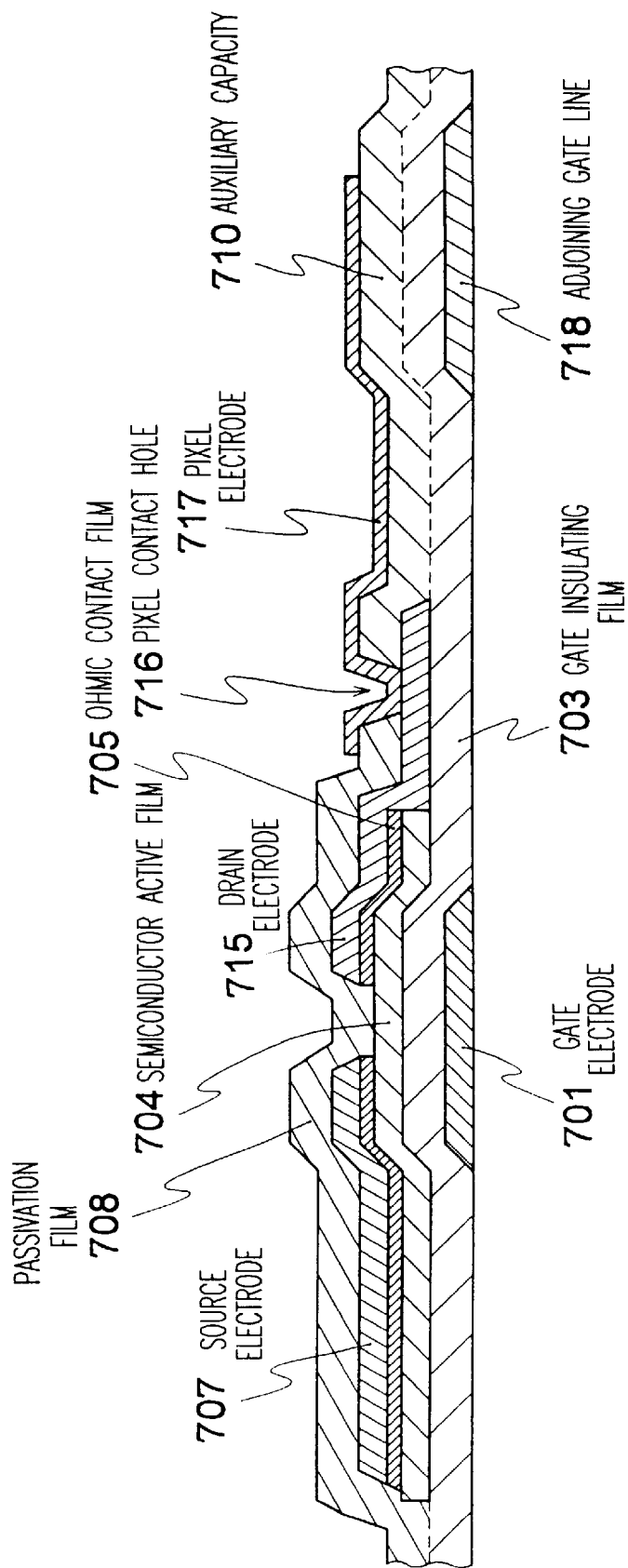
FIG. 11 is a cross-sectional view illustrating the main portion of the display pixel related to Embodiment 7 and 8 of the present invention.
Figure 12:
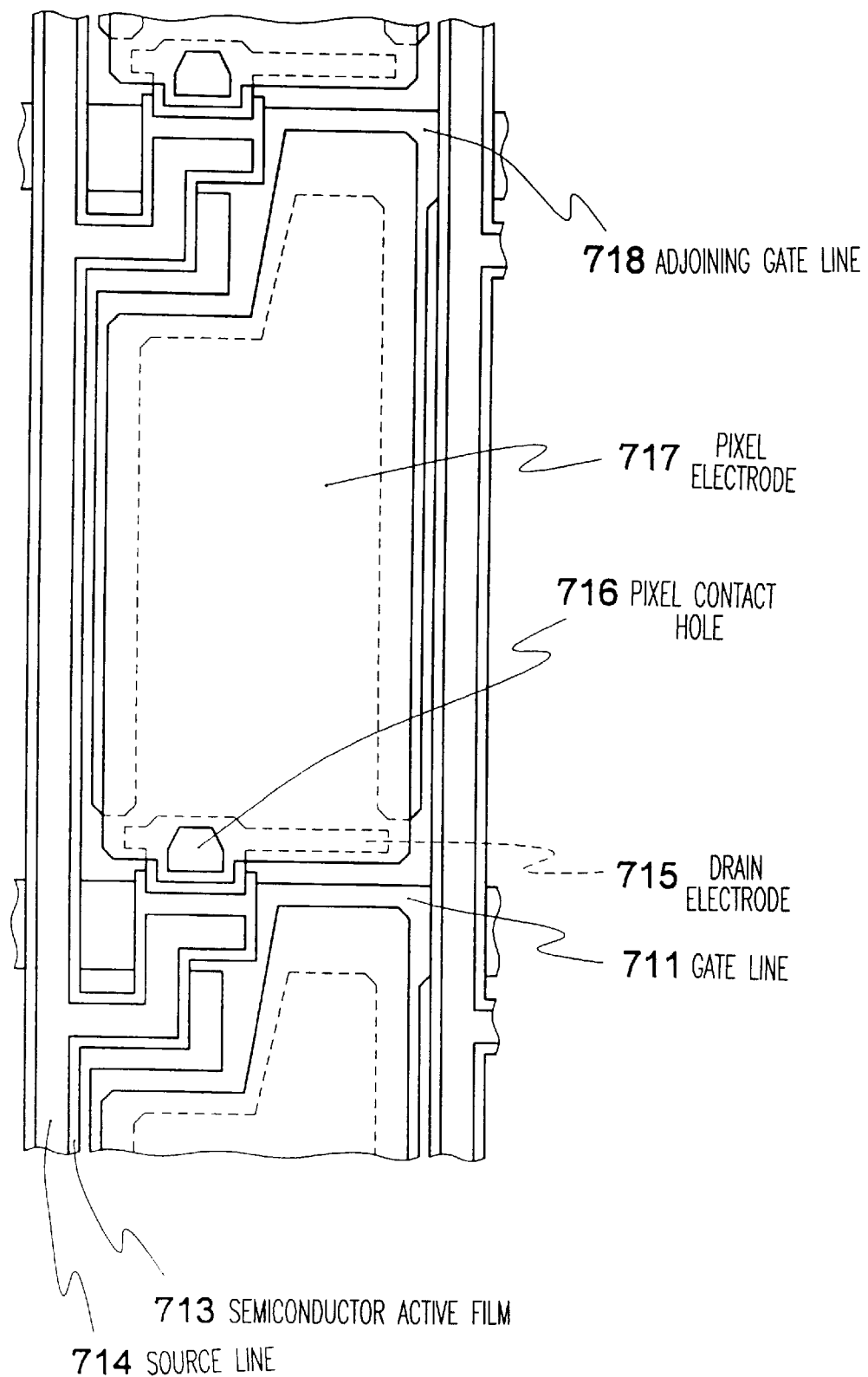
FIG. 12 is a plane view illustrating the display pixel related to Embodiment 7 of the present invention.

FIG. 11 and FIG. 12 are a cross-sectional view and a plan view of the display pixel fabricated by the method for manufacturing the electro-optic element related to Embodiment 7 according to the present invention. In FIG. 11 and FIG. 12, numeral 701 designates the gate electrode, 702 the auxiliary capacity electrode, 703 the gate insulating film, 704 the semiconductor active film, 705 the ohmic contact film, 707 the source electrode, 708 the passivation film, 710 the auxiliary capacity, 712 the auxiliary capacity line, 713 the semiconductor active film and ohmic contact film, 714 the source line, 715 the drain electrode, 716 the pixel contact hole, 717 the pixel electrode and 718 the adjoining gate line. The cross-section of the TCP terminal portion provided outside the display region for connecting the gate line, source line, auxiliary capacity line, and signal potential source to be inputted to the common electrode on the opposite electrode to the gate line, the source line, the auxiliary capacity line, and the common electrode is the same as that shown in FIG. 3 and FIG. 4.

The features of the display pixel related to this embodiment lies in the auxiliary capacity line is formed with part of the gate line of the preceding stage. That is, for example, the auxiliary capacity electrode is provided in the form to use part of the gate line (adjoining gate line 718) which is scanned one scanning period before the gate line 711 which scans the TFT related to the pixel electrode 717 shown in FIG. 12, and is constructed as the auxiliary capacity electrode and auxiliary capacity line. Except the point in which the auxiliary capacity line is configured with part of the gate line of the previous stage, all other constructions are same as those of Embodiment 1. Though the method for manufacturing the display pixel related to this embodiment is same as that of Embodiment 1, because the auxiliary capacity is formed between the adjoining gate line and pixel electrode, there is not need for newly providing the auxiliary capacity line, there is no short-circuiting between the gate line and the auxiliary capacity line, and an electro-optic element with a high aperature ratio can be manufactured.

Embodiment 8

Figure 13:
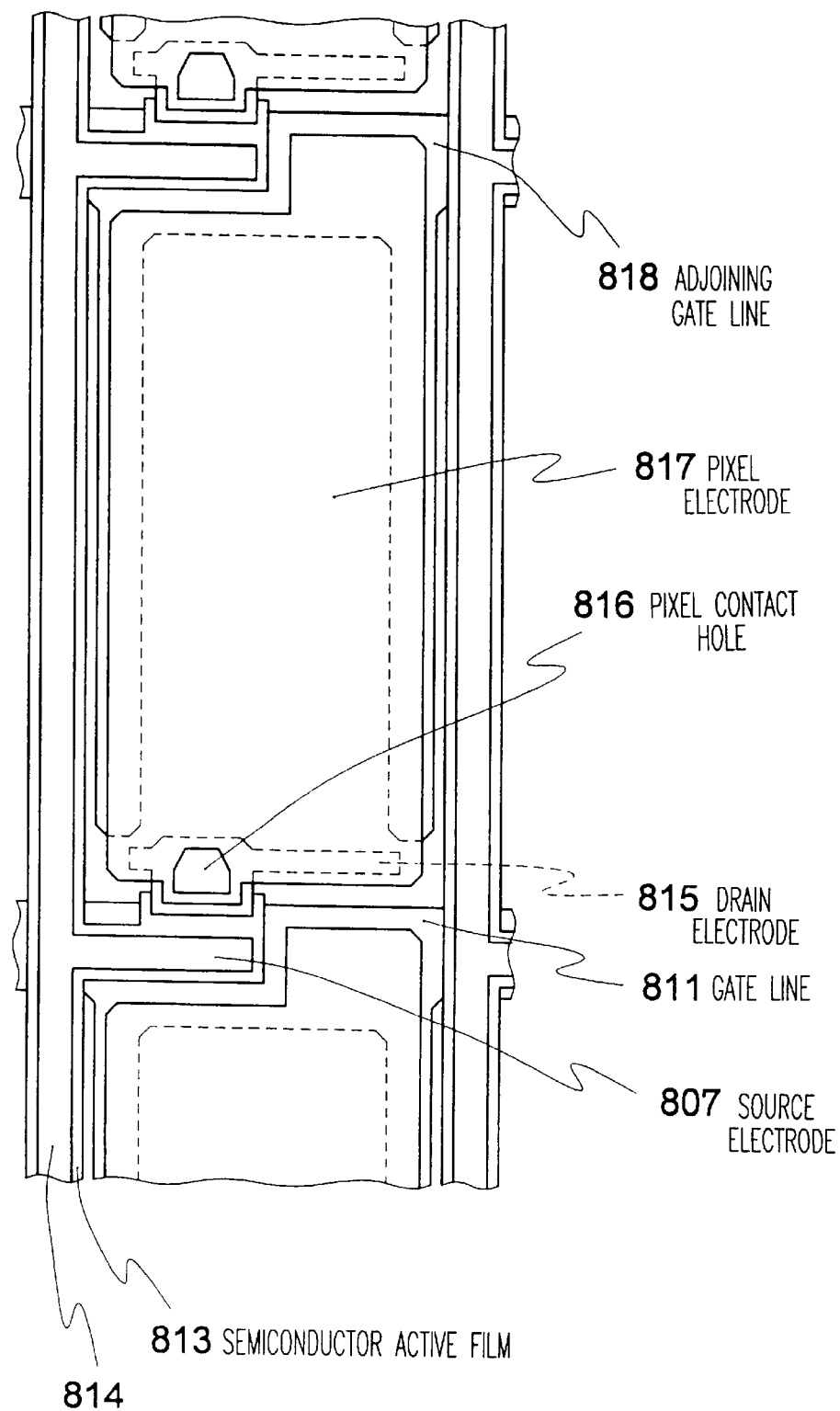
FIG. 13 is a plane view illustrating the display pixel related to Embodiment 8 of the present invention.

FIG. 13 are a plan view of the display pixel fabricated by the method for manufacturing the electro-optic element related to Embodiment 8 according to the present invention. In FIG. 13, numeral 807 designates the source electrode, 811 the gate line, 810 the auxiliary capacity, 813 the semiconductor active film and ohmic contact film, 815 the drain electrode, 816 the pixel contact hole, 817 the pixel electrode and 818 the adjoining gate line. The construction of the main cross section of the display pixel is same as the construction shown in FIG. 11. In addition, the cross section of the TCP terminal portion connecting the gate line, source line, auxiliary capacity line, and signal potential source to be inputted to the common electrode on the opposite electrode provided outside the display region, to the gate line, the source line, the auxiliary capacity line, and the common electrode is the same as that shown in FIG. 3 and FIG. 4.

Except the changes made in the method for pulling out the source electrode in such a manner that the source electrode can be pulled out on the gate line from the intersecting portion between the source line and gate line, and the manufacturing method of display pixel are same as Embodiment 1. In this embodiment, as described above, because the source electrode of the TFT portion is pulled out on the gate line from the intersecting portion between the source line and the gate line, the frequency exceeding the gate line terminal can be reduced one time for each pixel from the case of Embodiment 1. Consequently in this embodiment, it is possible to eliminate short-circuiting between the gate line and the source electrode due to level difference of the gate line edge. In addition, in this embodiment, because it is possible to widen the inter-line distance between the gate line and auxiliary capacity line (portion parallel to the gate line) which are different line installation in the same layer which only exists in using the auxiliary capacity line of the present invention, short-circuiting between the gate line and the auxiliary capacity line by defective patterning can be reduced.

Embodiment 9

Figure 14:
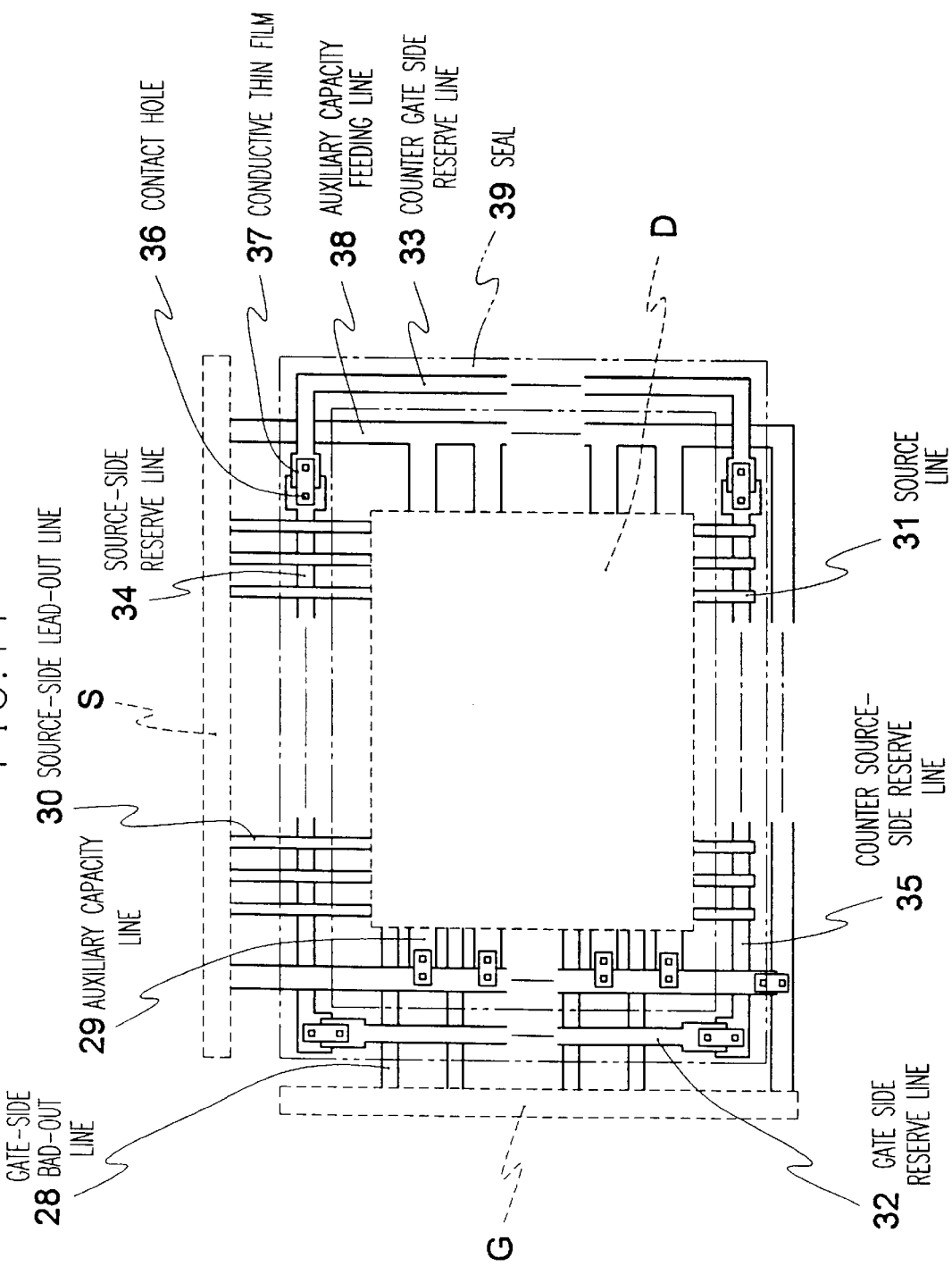
FIG. 14 is a plan view illustrating the periphery wirings for the display pixel related to Embodiment 9 of the present invention.
Figure 15:
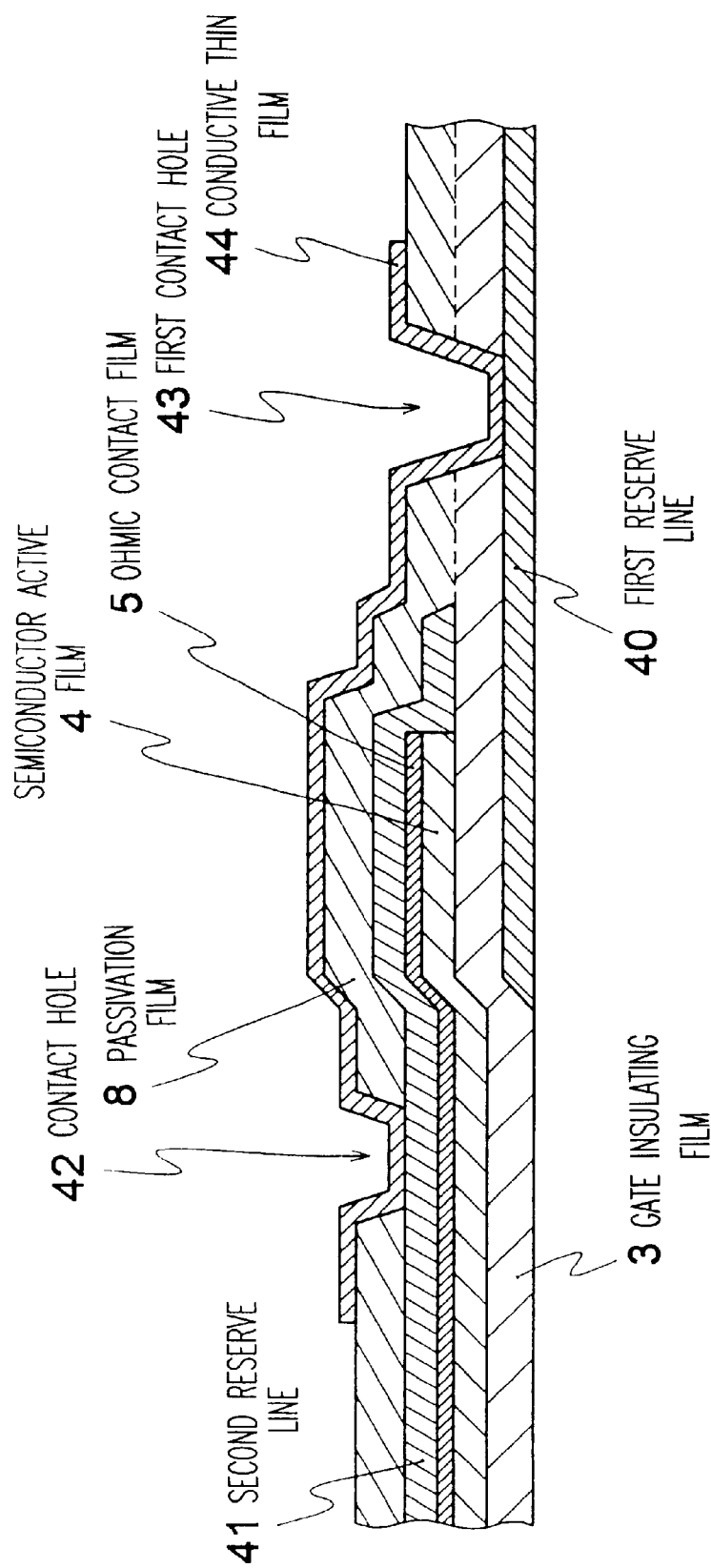
FIG. 15 is a cross-sectional view illustrating the connecting portion between the preliminary wirings related to Embodiment 3 of the present invention.
Figure 16:
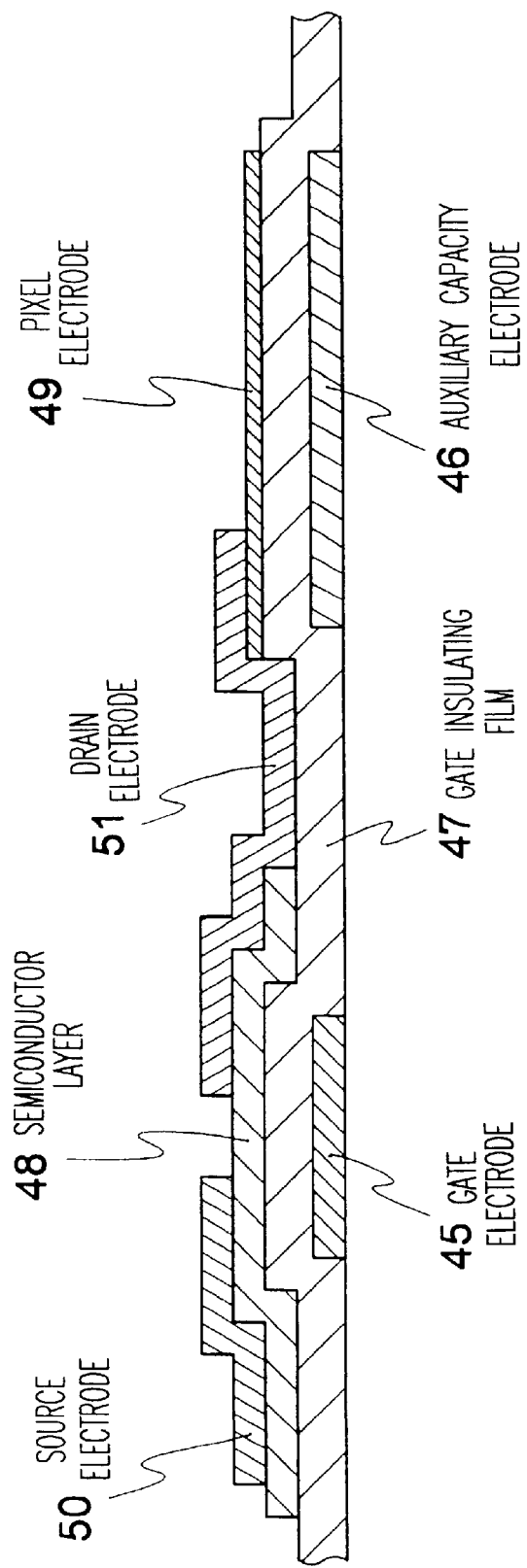
FIG. 16 is a cross-sectional view illustrating the display pixel disclosed in Japanese Unexamined Patent Publication No. 97386/1985.
Figure 17:
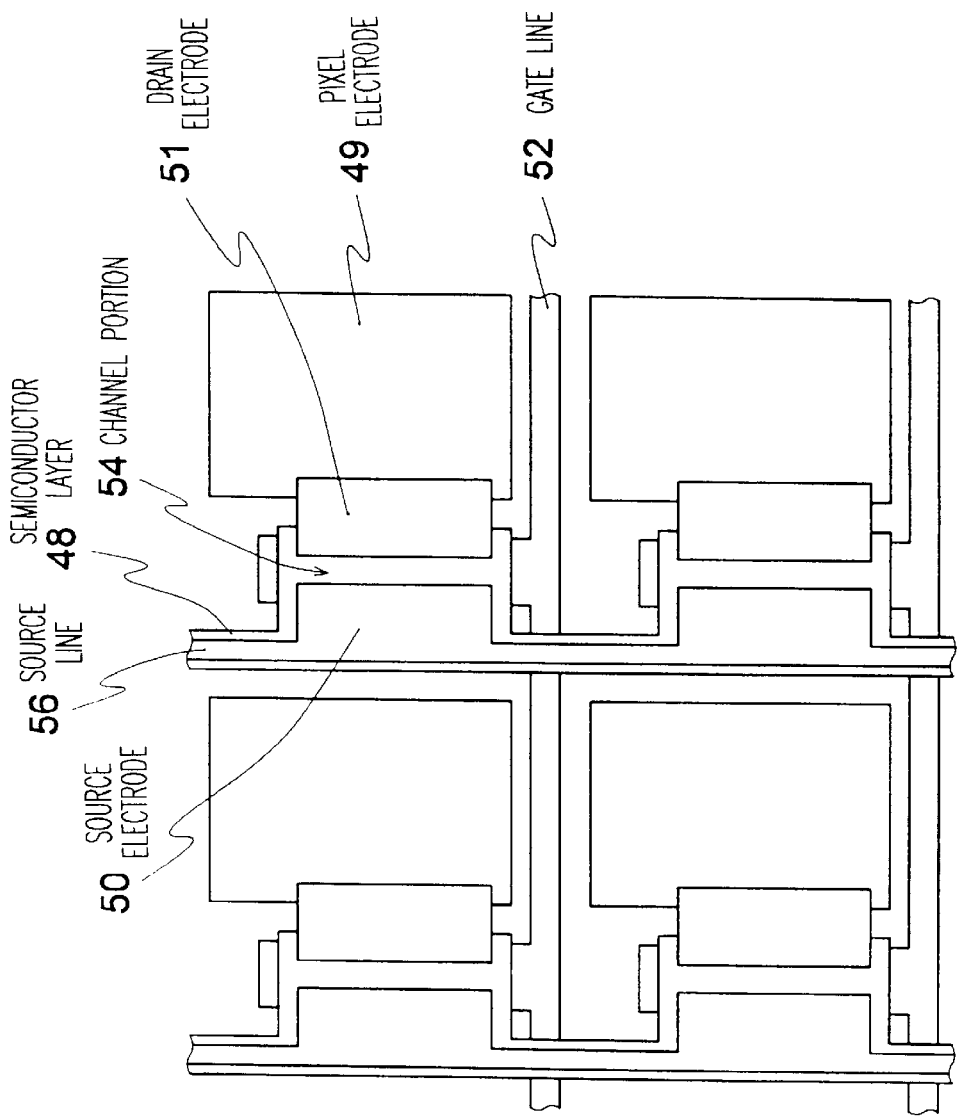
FIG. 17 is a plan view illustrating the display pixel disclosed in Japanese Unexamined Patent Publication No. 97386/1985.
Figure 19:
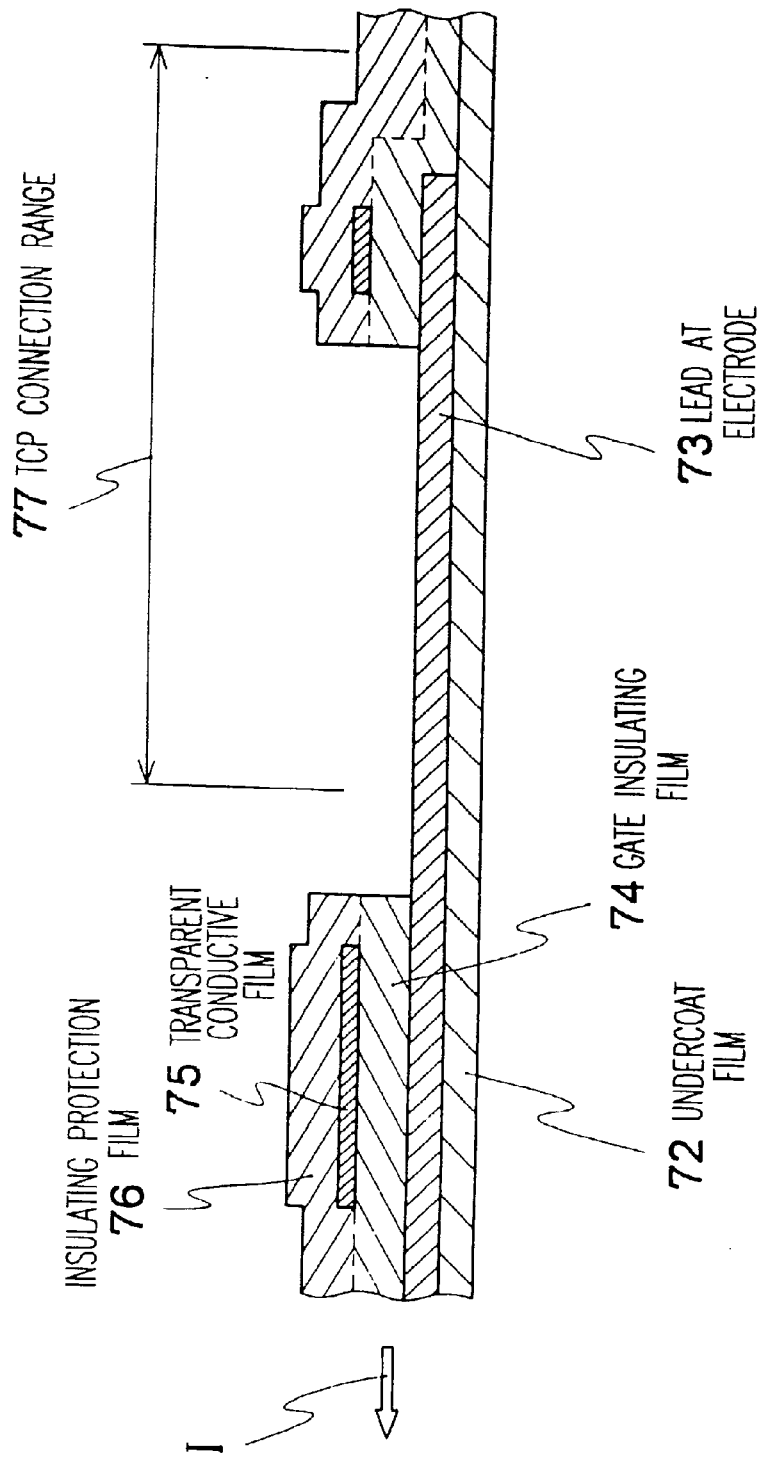
FIG. 19 is a cross-sectional view illustrating the display pixel disclosed in Japanese Unexamined Patent Publication No. 92496/1995.

FIG. 14 and FIG. 15 are plan view showing the peripheral line of the display region of the TFT array substrate manufactured by the method for manufacturing the electro-optic element related to the embodiment 9 according to the present invention and a cross-sectional view of connections between reserve lines used in this embodiment. In FIG. 14 and FIG. 15, numeral 28 designated the gate-side lead-out line, 29 the auxiliary capacity line, 30 the source side lead-out line, 31 the source line, 32 the gate-side reserve line, 33 the counter gate side reserve line, 34 the source-side reserve line, 35 the counter source-side reserve line, 36 the contact hole, 37 and 44 conductive thin film, 38 the auxiliary capacity feeding line, 39 the seal, 40 the first reserve line, 41 the second reserve line, 41 the second reserve line, and the second reserve line, and 42 the contact hole. Reference character D designates the display pixel array portion, G the gate-side TCP connections, S the source side TCP connections, and other reference characters are common to those shown in FIG. 1. The first reserve line is the reserve line formed with the first metal thin film, and the second reserve line is the reserve line formed with the second metal thin film. In this embodiment, the first metal thin film is patterned and the source side reserve line 34 is formed intersecting at right angles with the source side lead-out line 30, and similarly, the first metal thin film is patterned and the counter source side reserve line 35 is formed intersecting at right angles with the source line extended to the side opposite to the side on which the source side lead-out line 30 of the display region is formed. Similarly, the gate side reserve line 32 of the laminated structure formed by patterning the second metal line together with the semiconductor active film and ohmic contact film is formed intersecting at right angles with the gate side lead-out line 28, and in addition, on the side opposite to the side where the gate side lead-out line 28 of the display region is formed, there formed is the counter gate side reserve line 33 of the laminated structure formed by patterning the second metal thin film as well as the semiconductor active film and ohmic contact film. The gate side reserve line 32, source side reserve line 34, counter gate side reserve line 33, and counter source side reserve line 35 have the intersecting portions where part of the line intersect at right angles one another, respectively. In the vicinity of the relevant intersecting portions, the first contact hole 43 that penetrates to the first metal thin film surface and the second contact hole 42 that penetrates to the second metal thin film are formed with the first insulating film and the second insulating film patterned, and in addition, the conductive thin film 37 is formed in such a manner to electrically connect the first contact hole and the second contact hole.

The method for manufacturing the display pixels according to this embodiment is the same as that of embodiment 1, but in this embodiment, reserve line is formed around the display portion. Consequently, in the case any disconnection of the source line (source disconnection) occurs, signals can be fed to the source line located ahead of the source disconnected portion as seen from the source side TCP connections via the reserve line, and the line defect by source disconnection can be corrected.

In this embodiment, in the first photolithography process, the first metal thin film is patterned to form the source side reserve line and counter source side reserve line. Then, in the second photolithography process, the semiconductor active film 4 and ohmic contact film 5 are formed as shown in FIG. 15, respectively, at the overlapping portion of the source side reserve line 34 and counter gate side reserve line 32, at the overlapping portion of the source side reserve line 34 and gate side reserve line 33, at the overlapping portion of the counter source side reserve line 34 and gate side reserve line 32, and at the overlapping portion of the counter source side reserve line 34 and counter gate side reserve line 33.

In this event, the semiconductor active film and ohmic contact film are formed by patterns larger than the gate side reserve line 32 formed on the bottom layer on which the gate side reserve line 32 is later formed, and similarly, are formed by the patterns larger than the pattern of the counter gate side reserve line 33 on the bottom layer on which the counter gate side reserve line 33 is formed. In the third photolithography process, the second metal thin film is patterned and the gate side reserve line 32 and the counter gate side reserve line 33 are formed. In the fourth photolithography process, the first insulating film and the second insulating film are patterned and the first contact hole 42 and the second contact hole 43 are formed. In the fifth photolithography process, the conductive thin film is patterned to form the conductive thin film 44. In this way, around the display portion, reserve lines are formed.

In the case any source disconnection is found by various inspections later on, by electrically connecting the intersecting portions between the source side lead-out line 30 and the source side reserve line 34 and the intersecting portions between the source line 31 and counter source side reserve line 35 by laser irradiation, the source disconnection can be corrected. It is preferable that the location of the reserve line should be within the seal formed around the display portion in view of the reliability. The reason is that the reserve line is not exposed to the atmosphere or liquid crystals. Furthermore, at the intersecting portion between source side reserve line and counter source side reserve line 35 and at the intersecting portion between the gate side reserve line 32 and counter gate side reserve line 33, it is frequently necessary to reduce the size of the contact hole. In the case this contact resistance increases, as shown in FIG. 15, the intersecting portion between the source side lead-out line 30 and the source side reserve line 34 and intersecting portion between the source line 31 and the counter source side reserve line 35 can be formed in the similar laminate construction. That is, the first metal thin film, gate insulating film, semiconductor active film, ohmic contact film, and passivation film are laminated sequentially from the bottom in that order. By this construction, laser irradiation connection for the intersecting portion between the source side lead-out line 30 and the source side reserve line 34 can be implemented under the same conditions of laser connections for the intersecting portion between the source line 31 and counter source side reserve line 35. The source side reserve line 34 and the counter source side reserve line 35 can be formed electrically separated on the right and left of the display portion. And the reserve line can be formed in a plurality.

As described above, according to the present invention stated in claim 1, the TFT array substrate can be manufactured in 5 processes containing the photolithography process, respectively, and the source line and source electrode do not go over the level difference of the semiconductor active film and ohmic contact film in the display portion, and disconnection of source line and source electrode arising from level difference between the semiconductor active film and ohmic contact film can be eliminated. Even though it is formed with the semiconductor active film and ohmic contact film left around the pixel electrode, by designing that the pixel electrode and semiconductor active film as well as the ohmic contact film and source line are separated with the second insulating film, it is possible to eliminate simple short-circuiting between the source line and pixel electrode due to defective patterns of semiconductor active film and ohmic contact film, and source line or generation of short-circuiting when the semiconductor active film is made low resistance. In general, when the semiconductor active film and the ohmic contact film are extended from the TFT portion to below the source line, it is assumed that the TFT OFF current increases due to low resistance of semiconductor active film by light irradiation. When the inventor of the present invention made experimental confirmation, when the a-Si film is at least 100 nm or thicker, it has been confirmed that the increase of OFF current is not big enough to have effects on the display. To reduce the OFF current in this light irradiation, it is effective to increase the deposition-rate so that the resistance on the source electrode and drain side of a-Si film increases. As in the case of Embodiments 1, 3, 4 or 5, varying the relative positional relationship of pixel electrode to the source line, gate line, auxiliary capacity line, and TFT portion, it is possible to manufacture the electro-optic element with high aperture ratio while mitigating the conditions concerning the liquid crystal, alignment controlling film, drive voltage, and drive waveform.

According to the present invention stated in claim 2, by forming the lead-out of the source electrode from the source line to the TFT portion in a place different from the intersecting portion between the gate line and source line as in the case of Embodiment 1, 2, 3, 4, 5, or 7, it is possible to get rid of the influence on other pixels by cutting any defect occurring in the pixel portion by laser irradiation.

According to the present invention stated in claim 3, by forming the lead-out of source electrode from the source line to the TFT portion to the gate line from the intersecting portion between the gate line and source line as in the case of Embodiment 2, 6 or 8, the source electrode does not go over the gate line edge portion and it becomes possible to eliminate short-circuiting between the gate line and the source electrode at the gate line edge portion.

According to the present invention stated in claim 4, because the auxiliary capacity is formed from the first insulating film and the second insulating film as in the case of Embodiment 1, 2, 3, 4, 5, 6, 7, or 8, it is possible to manufacture an electro-optic element which does not cause short-circuiting between the pixel electrode and the auxiliary capacity electrode in the case any pinhole is generated in either one of the films.

According to the present invention stated in claim 5, because the special-purpose auxiliary capacity line is used as in the case of Embodiment 1, 2, 3, 4, 5, or 6, it is possible to reduce distortion of signals inputted to the auxiliary capacity line and it is possible to manufacture an electro-optic element with high display quality.

According to the present invention stated in claim 6, because no special-purpose auxiliary capacity line is required as in the case of Embodiment 7 or 8, it is possible to manufacture an electro-optic element with high opening rate. In this event, in order to reduce the distortion of signals inputted via the gate line during unselection period, it is possible to manufacture an electro-optic element with high display quality by reducing the line resistance, reducing the output impedance of the signal source, etc.

According to the present invention stated in claim 7, because no contact is required between layers for the gate line and the source line, gates, line can be formed in one continuous pattern, to TCP output terminal connections. Consequently, the electric resistance from the TCP output terminal to TFT portion can be reduced and at the same time highly reliable construction can be achieved.

According to the present invention stated in claim 8, because the contact hole formed at the output terminal connections of TCP can be completely covered with ACF, it is possible to manufacture an electro-optic element with high reliability against humidity.

According to the present invention stated in claim 9, reserve line can be formed around the display portion in five processes containing the photolithography process, respectively, and correction becomes possible when source disconnection occurs.

Though several embodiments of the present invention are described above, it is to be understood that the present invention is not limited only to the above-mentioned, various changes and modifications may be made in the invention without departing from the spirit and scope thereof.

What is claimed is:

1. A method for manufacturing electro-optic elements including a first insulating substrate wherein a display pixel having a pixel electrode in which a TFT is electrically connected is formed as an array, a TFT array substrate wherein a gate line for sequentially scanning each TFT intersects at right angles a source line which provides a signal potential to the pixel electrode, and a second insulating substrate having an opposite substrate on which a color filter and a common electrode are formed, wherein the TFT array substrate and the opposite substrate are affixed with a liquid crystal layer interposed in-between and polarizers are placed at the top of the TFT array substrate and at the bottom of the opposite substrate, respectively, comprising the steps:

forming gate electrodes of the gate line and the TFT by patterning a first metal thin film by a first photolithography process after forming the first metal thin film on the first insulating substrate;

patterning by dry etching a semiconductor active film and an ohmic contact film by a second photolithography process wherein the semiconductor active film and the ohmic contact film are formed in a continuous shape and are larger than a portion in which the source line and the TFT are formed, wherein said patterning step occurs after forming a first insulating film, the semiconductor active film, and the ohmic contact film;

patterning a second metal thin film by a third photolithography process after forming the second metal thin film to form a source electrode and a drain electrode of the source line as well as the TFT and etch-removing by dry etching the ohmic contact film protruding from the source line, the source electrode, and the drain electrode, wherein the source electrode is formed on the gate line of the source line extending from a portion other than intersecting portions between the gate line and the source line;

patterning a second insulating film and the first insulating film in a fourth photolithography process after forming the second insulating film and forming a pixel contact hole that penetrates at least to the drain electrode surface, a first contact hole that penetrates to the first metal thin film surface, and a second contact hole that penetrates the second metal thin film surface; and, patterning a conductive thin film and forming the pixel electrode by a fifth photolithography process after forming the conductive thin film.

2. A method for manufacturing electro-optic elements including a first insulating substrate wherein a display pixel having a pixel electrode in which a TFT is electrically connected is formed as an array, a TFT array substrate wherein a gate line for sequentially scanning each TFT intersects at right angles a source line which provides a signal potential to the pixel electrode, and a second insulating substrate having an opposite substrate on which a color filter and a common electrode are formed, wherein the TFT array substrate and the opposite substrate are affixed with a liquid crystal layer interposed in-between and polarizers are placed at the top of the TFT array substrate and at the bottom of the opposite substrate, respectively, comprising the steps:

forming gate electrodes of the gate line and the TFT by patterning a first metal thin film by a first photolithography process after forming the first metal thin film on the first insulating substrate;

patterning by dry etching a semiconductor active film and an ohmic contact film by a second photolithography process wherein the semiconductor active film and the ohmic contact film are formed in a continuous shape and are larger than a portion in which the source line and the TFT are formed, wherein said patterning step occurs after forming a first insulating film, the semiconductor active film, and the ohmic contact film;

patterning a second metal thin film by a third photolithography process after forming the second metal thin film to form a source electrode and a drain electrode of the source line as well as the TFT and etch-removing by dry etching the ohmic contact film protruding from the source line, the source electrode, and the drain electrode, wherein the source electrode is formed on the gate line of the source line extending from intersecting portions of the gate line and the source line;

patterning a second insulating film and the first insulating film in a fourth photolithography process after forming the second insulating film and forming a pixel contact hole that penetrates at least to the drain electrode surface, a first contact hole that penetrates to the first metal thin film surface, and a second contact hole that penetrates the second metal thin film surface; and, patterning a conductive thin film and forming the pixel electrode by a fifth photolithography process after forming the conductive thin film.

3. The method of claim 1 or claim 2 wherein auxiliary capacity to first and second display electrodes is formed between the first display electrode and the second display electrode via a dielectric substance in parallel with capacity formed between the pixel electrode and the common electrode via the liquid crystal layer, and either the first or the second display electrode is the pixel electrode and the dielectric substance is a laminated film including the first insulating film and the second insulating film.

4. The method of claim 3, wherein the other display electrode is an auxiliary capacity electrode, an auxiliary capacity line includes the first metal thin film, and the auxiliary capacity electrode and the auxiliary capacity line are formed simultaneously with the gate electrode and the gate line.

5. The method of claim 3, wherein the other display electrode is part of a gate line scanned one scanning period before a gate line for scanning the TFT connected to the pixel electrode.

6. The method of claim 4, wherein a display portion lead-out line is formed outside a display area with display pixels formed in an array, the display portion lead-out line includes a gate-side lead-out and a source-side lead-out line, a gate-side lead-out electrode connects a driver output connecting terminal including TCP loaded with a driver IC for installing to input a signal potential to the gate line, the source-side lead-out electrode connects the driver output connecting terminal of TCP loaded with the driver IC for providing to input the signal potential to the source line, the gate-side lead-out electrode is formed in a profile continuing from the gate line by patterning the first metal thin film, and the source-side lead-out electrode is formed in the profile continuing from the source line by patterning the second metal thin film.

7. The method of claim 6, wherein the driver output connecting terminal connecting to the gate-side lead-out line is constructed such that the first insulating film, the second insulating film, and the conductive thin film are laminated on the first metal thin film, the first metal thin film and the conductive thin film are electrically connected with the first contact hole, and the first contact hole is covered with an anisotropic conductive film which connects the TCP to the driver output connecting terminal on the gate line side; and, the driver output connecting terminal connecting to the source-side lead-out line is constructed such that the first insulating film, the second metal thin film, the second insulating film, and the conductive thin film are laminated on the first metal thin film, the first metal thin film and the second metal thin film and the conductive thin film are electrically connected with the second contact hole, and the second contact hole is covered with the anistropic conductive film.

8. The method of claim 6, further comprising th steps; forming a gate-side preliminary line which is a laminated structure by patterning the second metal thin film, the semiconductor active film, and the ohmic contact film to intersect with the gate-side lead-out line; forming a counter-gate-side preliminary line which is a laminated structure by patterning the second metal thin film, the semiconductor active film, and the ohmic contact film on the side opposite to the side on which the gate-side lead-out line is formed; forming a source-side preliminary line by patterning the first metal thin film to intersect with the source-side lead-out line; and, forming a counter-source-side preliminary line by patterning the first metal thin film to intersect with the source line formed by extending on the side opposite to the side in which the source-side lead-out line in the display region is formed; wherein the gate-side preliminary line, the source-side preliminary line, the counter-source-side preliminary line, and counter-gate-side preliminary line have portions partly overlapping one another in order to form the first contact hole and the second contact hole in the vicinity of the overlapping portions and to form the conductive thin film by patterning in such a manner as to electrically connect the first contact hole and the second contact hole.

9. The method of claim 5, wherein a display portion lead-out line is formed outside a display area with display pixels formed in an array, the display portion lead-out line includes a gate-side lead-out line and a source-side lead out line, a gate-side lead-out electrode connects a driver output connecting terminal including TCP loaded with a driver IC for installing to input a signal potential to the gate line, the source-side lead-out electrode connects the driver output connecting terminal of TCP loaded with the driver IC for providing to input the signal potential to the source line, the gate-side lea-out electrode is formed in a profile continuing from the gate line by patterning the first metal thin film, and the source-side lead-out electrode is formed in the profile continuing from the source line by patterning the second metal thin film.

* * * * *